US012130563B2

(12) United States Patent
Yamamoto

(10) Patent No.: US 12,130,563 B2
(45) Date of Patent: Oct. 29, 2024

(54) IMAGE FORMING APPARATUS, CONTROL METHOD, AND NON-TRANSITORY RECORDING MEDIUM

(71) Applicant: Yuusuke Yamamoto, Kanagawa (JP)

(72) Inventor: Yuusuke Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/355,492

(22) Filed: Jul. 20, 2023

(65) Prior Publication Data

US 2024/0069459 A1 Feb. 29, 2024

(30) Foreign Application Priority Data

Aug. 9, 2022 (JP) ................................ 2022-127304

(51) Int. Cl.
*G03G 15/02* (2006.01)

(52) U.S. Cl.
CPC ................................ *G03G 15/0266* (2013.01)

(58) Field of Classification Search
CPC ........... G03G 15/0266; G03G 15/0283; G03G 15/5004; G03G 15/751; G03G 15/80
USPC ...................................................... 399/50, 66
See application file for complete search history.

(56) References Cited

U.S. PATENT DOCUMENTS 9,031,480 B2 * 5/2015 Suzuki .................. G03G 15/14 399/314
2015/0177665 A1 * 6/2015 Saito ................. G03G 15/5037 399/25
2021/0132538 A1 5/2021 Yamamoto

FOREIGN PATENT DOCUMENTS

JP 2015-158602 A 9/2015
JP 2019-086531 A 6/2019
JP 2020-154039 A 9/2020
JP 2021-071715 A 5/2021

* cited by examiner

*Primary Examiner* — Hoang X Ngo
(74) *Attorney, Agent, or Firm* — IPUSA, PLLC

(57) ABSTRACT

An image forming apparatus includes an image bearer, a power source to generate a voltage, a voltage applying device facing the image bearer, the voltage applying device being applied with the voltage, and circuitry to control the voltage of the power source. The circuitry switches the voltage between a first direct current (DC) bias and a second DC bias different from the first DC bias, and changes the first DC bias in accordance with a speed of the image bearer, based on a DC component of a current flowing between the power source and the image bearer during application of the second DC bias.

12 Claims, 20 Drawing Sheets

FIG. 11

| | V1 WHEN $\lambda$=100mm/s | V1 WHEN $\lambda$=200mm/s | V1 WHEN $\lambda$=300mm/s |
|---|---|---|---|
| V1_1 | −400 | −280 | −250 |
| V1_2 | −720 | −424 | −350 |
| V1_3 | −1040 | −568 | −450 |
| V1_4 | −1360 | −712 | −550 |
| V1_5 | −1680 | −856 | −650 |
| V1_6 | −2000 | −1000 | −750 |

FIG. 19

| | V1 WHEN d=40 μm | V1 WHEN d=30 μm | V1 WHEN d=20 μm |
|---|---|---|---|
| V1_1 | −350 | −300 | −250 |
| V1_2 | −560 | −440 | −350 |
| V1_3 | −770 | −580 | −450 |
| V1_4 | −980 | −720 | −550 |
| V1_5 | −1190 | −860 | −650 |
| V1_6 | −1400 | −1000 | −750 |

IMAGE FORMING APPARATUS, CONTROL METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-127304, filed on Aug. 9, 2022, in the Japan Patent Office, the entire disclosure of which is hereby incorporated by reference herein.

BACKGROUND

Technical Field

The present disclosure relates to an image forming apparatus, a control method, and a non-transitory recording medium.

Related Art

In an electrophotographic image forming apparatus, a charging roller may get dirty over time, and dirt or the like on the charging roller may cause deviations from a desired surface potential of a photoconductor, resulting in unwanted images. One possible method for preventing this is to detect the surface potential of the photoconductor and adjust a charging direct current (DC) bias such that an appropriate surface potential can be obtained. However, using a surface potential sensor has drawbacks such as increased cost and limited layout of the apparatus.

Accordingly, an image forming apparatus is provided that detects a direct current flowing between a photoconductor and a conductive member (such as a charging device, a transfer device, or a developer charging member) without using a surface potential sensor to detect the surface potential of the photoconductor.

SUMMARY

According to an embodiment of the present disclosure, an image forming apparatus includes an image bearer, a power source, a voltage applying device, and circuitry. The power source generates a voltage. The voltage is applied to the voltage applying device facing the image bearer. The circuitry controls the voltage of the power source. The circuitry switches the voltage between a first direct current (DC) bias and a second DC bias different from the first DC bias. The circuitry changes the first DC bias in accordance with a speed of the image bearer, based on a DC component of a current flowing between the power source and the image bearer during application of the second DC bias.

According to an embodiment of the present disclosure, a control method for controlling an image forming apparatus includes switching a voltage to be applied to a voltage applying device between a first direct current (DC) bias and a second DC bias different from the first DC bias, the voltage applying device facing an image bearer; detecting a DC component of a current flowing between a power source that generates the voltage and the image bearer during application of the second DC bias; and changing the first DC bias in accordance with a speed of the image bearer.

According to an embodiment of the present disclosure, a non-transitory recording medium stores a plurality of instructions which, when executed by one or more processors, causes the processors to perform a control method for controlling an image forming apparatus. The control method includes switching a voltage to be applied to a voltage applying device between a first direct current (DC) bias and a second DC bias different from the first DC bias, the voltage applying device facing an image bearer; detecting a DC component of a current flowing between a power source that generates the voltage and the image bearer during application of the second DC bias; and changing the first DC bias in accordance with a speed of the image bearer.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 11 is a table illustrating settings of a first charging DC bias according to the linear velocity in the first embodiment of the present disclosure;

FIG. 19 is a table illustrating settings of a first charging DC bias according to the film thickness in the second embodiment of the present disclosure.

Figure 1:
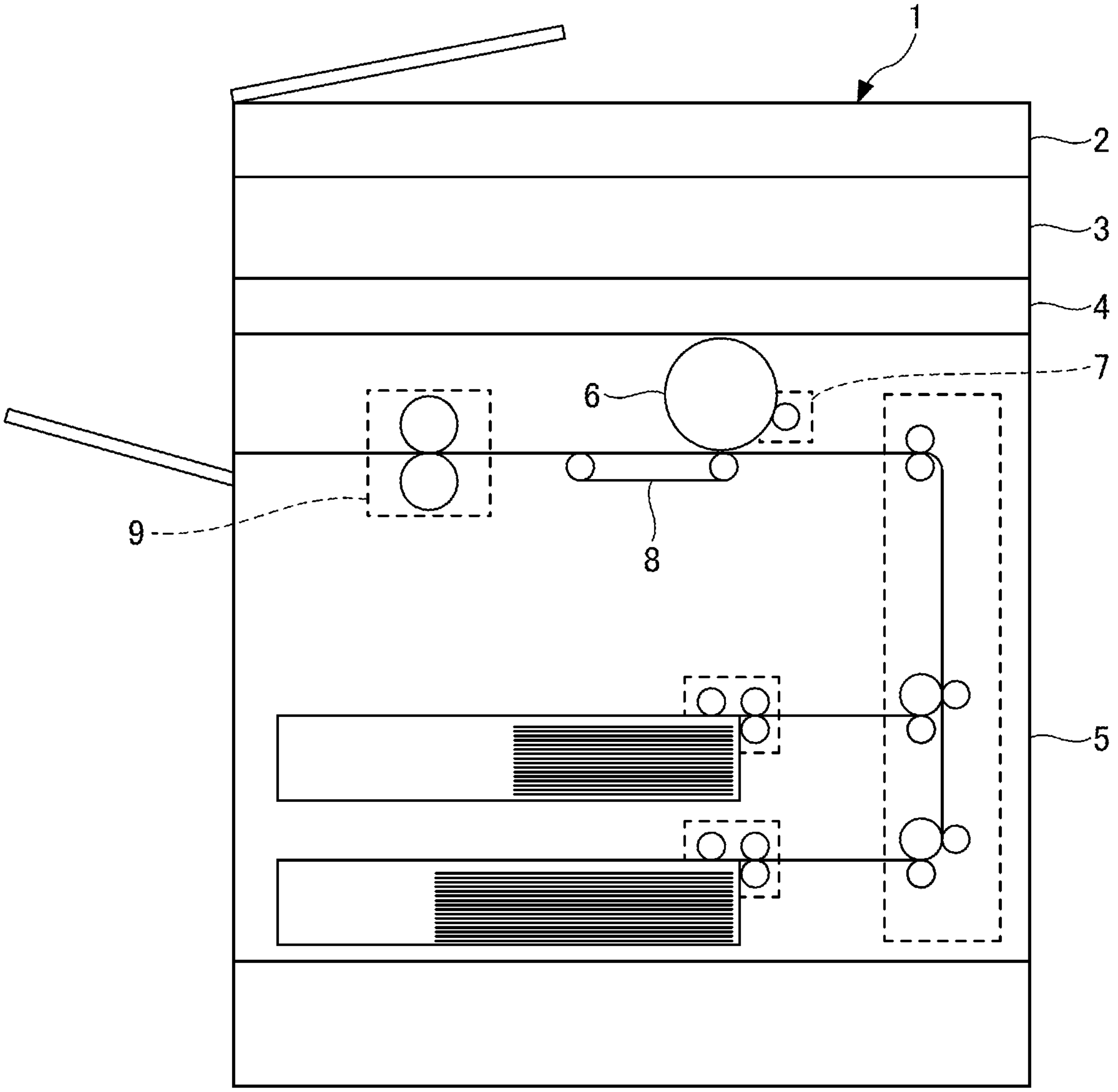
FIG. 1 is a diagram illustrating the general arrangement of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

General Arrangement of Image Forming Apparatus

FIG. 1 is a diagram illustrating the general arrangement of an image forming apparatus 1 according to an embodiment. The image forming apparatus 1 is, for example, a digital multifunction peripheral (MFP) having multiple functions such as a copy function, a printer function, and a facsimile function. The image forming apparatus 1 includes an auto document feeder (ADF) 2, an image reading device 3 such as an image scanner, a writing device 4 such as a laser scanner, and a printing device 5 such as a printer. The printing device 5 includes a photoconductor drum 6, a developing device 7, a conveyance belt 8, and a fixing device 9. The image forming apparatus 1 also has an operation unit such as an operation panel.

The image forming apparatus 1 operates such that the copy function, the printer function, and the facsimile function are sequentially switched by an application switching key of the operation unit. When the copy function is selected, the image forming apparatus 1 operates in a copy mode. When the printer function is selected, the image forming apparatus 1 operates in a printer mode. When the facsimile function is selected, the image forming apparatus 1 operates in a facsimile mode.

An image forming process of the image forming apparatus 1 will be briefly described hereinafter in the context of the copy mode as an example. In the copy mode, the ADF 2 sequentially feeds a bundle of documents placed on the ADF 2 to the image reading device 3 one by one. The image reading device 3 sequentially reads image data of the fed documents. Then, the writing device 4 converts the read image data into optical data by using an image processor.

In the printing device 5, a charging roller 12 described below (see FIG. 2 described below) uniformly charges the photoconductor drum 6. The photoconductor drum 6 is a drum-shaped conductor having a photosensitive layer thereon. After being charged, the writing device 4 exposes light based on the optical data to the photoconductor drum 6 to form an electrostatic latent image thereon. The developing device 7 develops the electrostatic latent image on the photoconductor drum 6 into a toner image. The toner image is transferred onto a recording medium conveyed by the conveyance belt 8. The toner image transferred onto the recording medium is fixed onto the recording medium by the fixing device 9 and is then discharged to a tray.

Configuration of Electrophotographic Process

Figure 2:
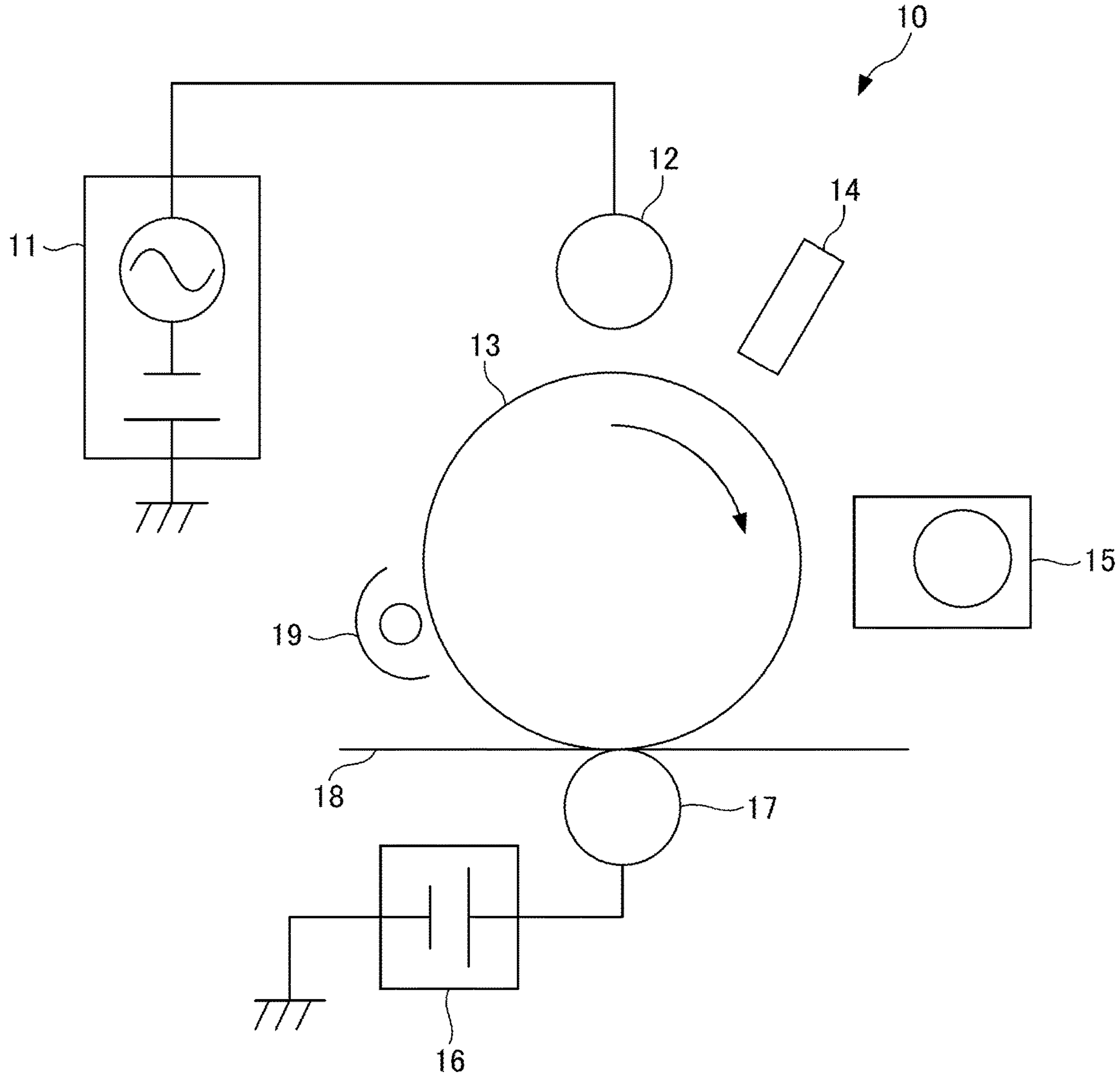
FIG. 2 is a diagram illustrating the configuration of an image forming device of an image forming apparatus according to an embodiment of the present disclosure.

FIG. 2 is a diagram illustrating the configuration of an image forming device 10 of the image forming apparatus 1 according to the present embodiment. The image forming device 10 executes an electrophotographic process. The image forming device 10 includes an image-forming high-voltage power source 11 (an example of a power source), the charging roller 12 (an example of a voltage applying device), a photoconductor 13 (an example of an image bearer), an exposure device 14, a developing device 15, a transfer high-voltage power source 16, a primary transfer roller 17, and an intermediate transfer belt 18. The image forming device 10 may include a charge remover 19, which is optional.

In another embodiment, the transfer high-voltage power source 16 is also an example of a "power source". In this case, the primary transfer roller 17 is an example of a "voltage applying device", and the intermediate transfer belt 18 is an example of an "image bearer".

The image-forming high-voltage power source 11 generates a high voltage and applies the high voltage to the charging roller 12. The charging roller 12 uniformly charges the photoconductor 13. The photoconductor 13 is, for example, a negatively charged organic photoconductor. The photoconductor 13 has a multi-layer structure including an undercoat layer, which serves as an insulating layer, a charge generation layer and a charge transport layer, which serve as a photosensitive layer, and a protective layer (i.e., a surface layer), which are layered on top of one another. The exposure device 14 irradiates light to the photoconductor 13 in accordance with an image signal to form an electrostatic latent image on the photoconductor 13.

The developing device 15 develops the electrostatic latent image on the photoconductor 13 to form a toner image. The transfer high-voltage power source 16 generates a high voltage and applies the high voltage to the primary transfer roller 17. The primary transfer roller 17 transfers the toner image on the photoconductor 13 onto the intermediate transfer belt 18. The toner image transferred onto the intermediate transfer belt 18 is transferred onto a recording medium by a secondary transfer unit such as a secondary transfer roller. The toner image transferred onto the recording medium is fixed by the fixing device 9 to form an image on the recording medium.

When the image forming device 10 includes the charge remover 19, the charge remover 19 removes the surface charge of the photoconductor 13 before a charging process is performed. In color printing, for each color of CMYK, a corresponding one of four image forming devices 10 having similar configurations transfers a toner image onto the intermediate transfer belt 18 and then conveys the toner image to the secondary transfer unit and the fixing device 9, thus forming a composite image of CMYK.

Configuration of Main Components of Image Forming Apparatus

Figure 3:
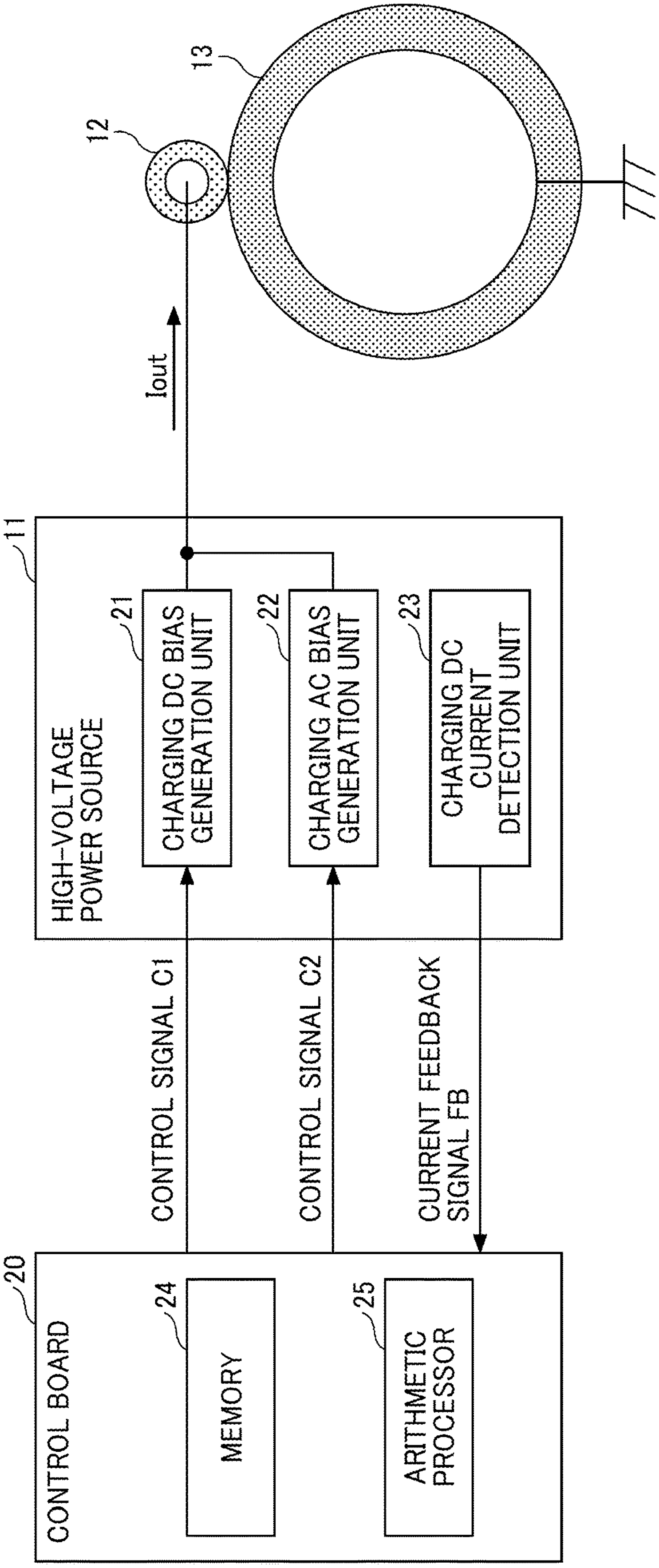
FIG. 3 is a diagram illustrating the configuration of main components of an image forming apparatus according to an embodiment of the present disclosure.

FIG. 3 is a diagram illustrating the configuration of main components of the image forming apparatus 1 according to the present embodiment. In the following description, the image-forming high-voltage power source 11 will be described as an example of a power source. However, the technology disclosed herein is not limited to the image-forming high-voltage power source 11 and may be applied to any other high-voltage power source such as the transfer high-voltage power source 16.

The image forming apparatus 1 includes the high-voltage power source 11 and a control board 20 (an example of a controller). The high-voltage power source 11 generates a charging bias to be applied to the charging roller 12. The high-voltage power source 11 adopts an alternating current (AC) charging method as a voltage applying method. In other words, the high-voltage power source 11 generates a charging bias (oscillating voltage), which is the superimposition of a charging DC bias and a charging AC bias, and applies the charging bias to the charging roller 12. The high-voltage power source 11 may adopt any other charging method such as a DC charging method.

The high-voltage power source 11 includes a charging DC bias generation unit 21, a charging AC bias generation unit 22, and a charging DC current detection unit 23. The charging AC bias generation unit 22 may be omitted when the high-voltage power source 11 adopts the DC charging method.

The charging DC bias generation unit 21 is a charging DC bias generation circuit that generates a charging DC bias. The charging AC bias generation unit 22 is a charging DC bias generation circuit that generates a charging AC bias.

The charging DC bias generation unit 21 receives a control signal C1 from the control board 20 and generates a charging DC bias having a magnitude and timing corresponding to the control signal C1. The charging AC bias generation unit 22 receives a control signal C2 from the control board 20 and outputs a charging AC bias having a magnitude and a timing corresponding to the control signal C2. The control signals C1 and C2 are pulse width modulation (PWM) signals, for example.

The charging DC bias generation unit 21 applies a first charging DC bias V1 (an example of a first DC bias) to the charging roller 12 to charge the photoconductor 13. After that, the charging DC bias generation unit 21 switches from the first charging DC bias V1 to a second charging DC bias V0 (an example of a second DC bias) and applies the second charging DC bias V0 to the charging roller 12 to remove the charge from the photoconductor 13. The absolute value of the first charging DC bias V1 is larger than the absolute value of the second charging DC bias V0 (i.e., $|V1|>|V0|$).

After the charging DC bias generation unit 21 switches from the first charging DC bias V1 to the second charging DC bias V0, the charge is removed from the photoconductor 13 by the charging AC bias generated by the charging AC bias generation unit 22.

During the application of the second charging DC bias V0, the charging DC current detection unit 23 detects a DC component (charging DC current) of an output current Iout (an example of a current) flowing between the high-voltage power source 11 and the photoconductor 13 through the charging roller 12. The charging DC current detection unit 23 generates a current feedback signal FB converted into a voltage and transmits the current feedback signal FB to the control board 20. The charging DC current detection unit 23 will be described in detail below.

In the following description, for removal of the charge from the photoconductor 13, the charging DC current detection unit 23 detects a positive output current Tout flowing from the high-voltage power source 11 to the photoconductor 13 through the charging roller 12 (i.e., a charge-removal current flowing to the right in FIG. 3), as a non-limiting example. In the technology disclosed herein, as alternative to detecting a charge-removal current, the charging DC current detection unit 23 may detect a negative output current Tout flowing from the photoconductor 13 to the high-voltage power source 11 through the charging roller 12 (i.e., a charging current flowing to the left in FIG. 3) for formation of an image on the photoconductor 13.

The control board 20 controls the high-voltage power source 11. The control board 20 includes an integrated circuit such as a micro processor unit (MPU). The control board 20 includes a memory 24 and an arithmetic processor 25.

Figure 4:
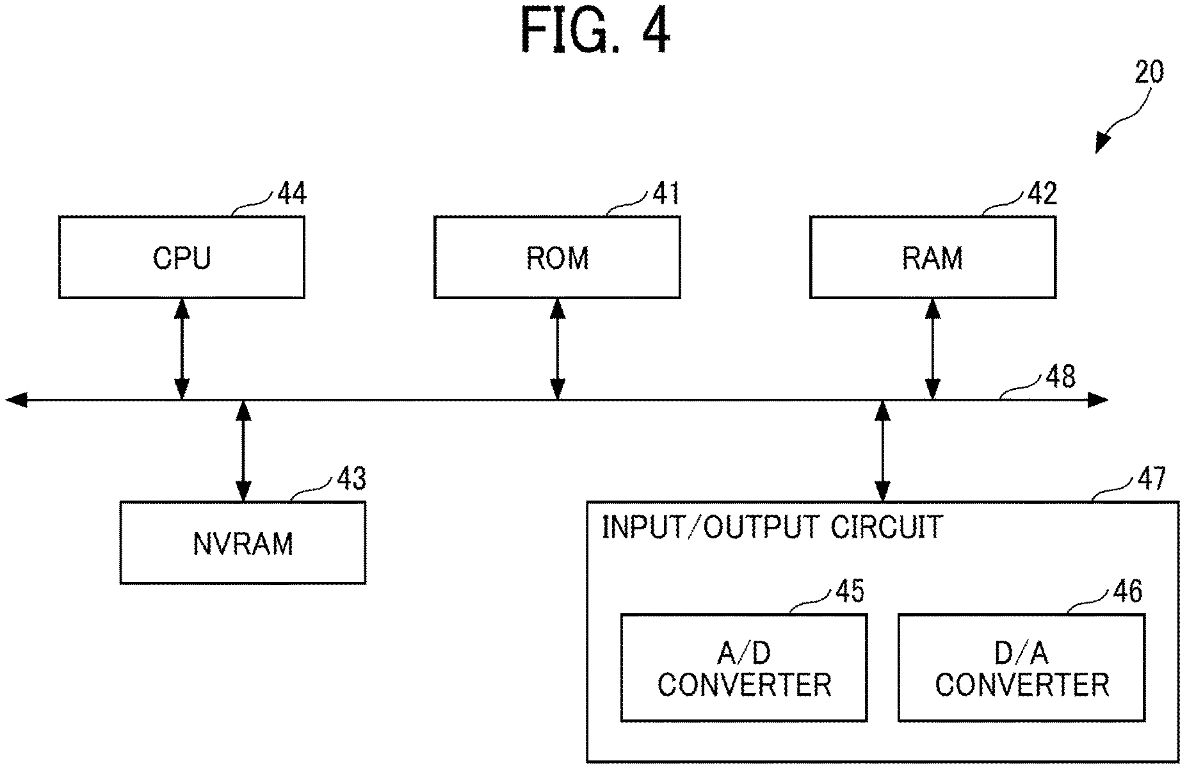
FIG. 4 is a diagram illustrating the hardware configuration of a control board according to an embodiment of the present disclosure.

FIG. 4 is a diagram illustrating the hardware configuration of the control board 20 illustrated in FIG. 3, according to the present embodiment. As illustrated in FIG. 4, the memory 24 includes a read only memory (ROM) 41 and a random access memory (RAM) 42. The memory 24 may include a non-volatile random access memory (NVRAM) 43.

The arithmetic processor 25 includes a processor such as a central processing unit (CPU) 44. The arithmetic processor 25 may include a field programmable gate array (FPGA) instead of or in addition to the CPU 44. Alternatively, the arithmetic processor 25 may include an application specific integrated circuit (ASIC) or the like instead of or in addition to the CPU 44.

The CPU 44 controls the entire control board 20 and executes various arithmetic processes. The ROM 41 stores a program to be used to drive the CPU 44, such as an initial program loader (IPL). The RAM 42 is used as a storage area for loading a program or as a work area for a loaded program. The NVRAM 43 stores various programs to be executed by the CPU 44 and data.

The control board 20 of FIG. 3 further includes an input/output circuit 47. The input/output circuit 47 includes an analog-to-digital (A/D) converter 45 and a digital-to-analog (D/A) converter 46. The components of the control board 20, such as the CPU 44, the ROM 41, the RAM 42, the NVRAM 43, and the input/output circuit 47, are connected to each other via a bus 48.

Referring back to FIG. 3, the control board 20 receives, at the A/D converter 45, the current feedback signal FB fed back from the high-voltage power source 11. The A/D converter 45 performs A/D conversion on the current feedback signal FB to obtain a current feedback signal voltage FBV.

The arithmetic processor 25 calculates a DC component (charging DC current) of the output current Iout of the high-voltage power source 11 by using the A/D conversion value (voltage value) of the current feedback signal FB, and stores the calculated DC component in the memory 24. The arithmetic processor 25 executes various processes on the basis of various kinds of information stored in the memory 24.

Relationship between Linear Velocity and Charge-Removal Current

Figure 5:
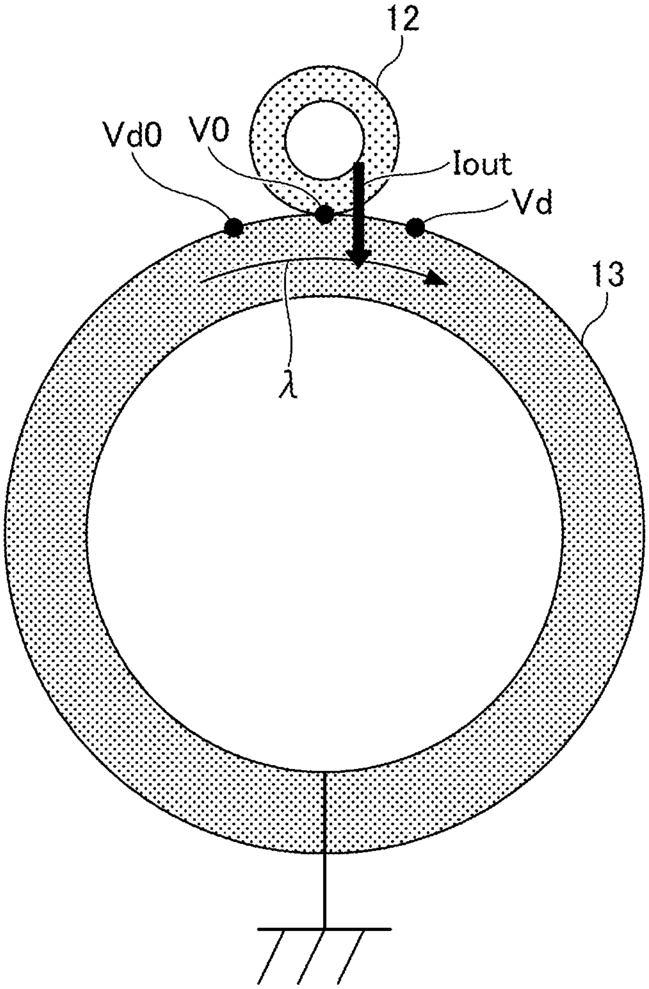
FIG. 5 is a view illustrating a relationship between the linear velocity of a photoconductor and the output current of a high-voltage power source according to an embodiment of the present disclosure.

The relationship between a linear velocity λ (an example of a speed) of the photoconductor 13 and the output current Iout (charging current or charge-removal current) of the high-voltage power source 11 will be described hereinafter. FIG. 5 is a view illustrating a relationship between the linear velocity λ of the photoconductor 13 and the output current Tout of the high-voltage power source 11 according to the present embodiment. The linear velocity λ is the speed of rotation of the photoconductor drum 6. When the image bearer is the intermediate transfer belt 18, the speed of movement of the intermediate transfer belt 18 is an example of a "speed".

Since the photoconductor 13 is charged by accumulation of charge in the surface layer of the photoconductor 13, charging the photoconductor 13 is considered to be equivalent to charging a capacitor. Equation (1) below holds among charge Q accumulated in the photoconductor 13, a surface potential Vd of the photoconductor 13 after charging, and a surface potential Vd0 of the photoconductor 13 before charging. In Equation (1), C denotes the capacitance of the photoconductor 13.

$$Q=C(Vd-Vd0) \qquad \text{Equation (1)}$$

The charge Q is also expressed by Equation (2) below and can be converted into the output current Tout of the high-voltage power source 11 (i.e., the charge-removal current flowing from the high-voltage power source 11 to the photoconductor 13 through the charging roller 12).

$$Q=\int Iout\, dt \qquad \text{Equation (2)}$$

$$\int Iout\, dt=C(Vd-Vd0) \qquad \text{Equation (3)}$$

Differentiating both sides of Equation (3) and substituting another variable for the capacitance C of the photoconductor 13 yield Equation (4) for the output current Tout of the high-voltage power source 11.

$$\begin{aligned} Iout &= \frac{d}{d}C\cdot(Vd-Vd0) \\ &= \frac{d}{dt}\left(\varepsilon\frac{S}{d}\right)\cdot(Vd-Vd0) \\ &= \frac{d}{dt}S\cdot\frac{\varepsilon}{d}(Vd-Vd0) \\ &= \frac{\varepsilon\cdot L\cdot\lambda}{d}(Vd-Vd0) \end{aligned} \qquad \text{Equation (4)}$$

In Equation (4), c is the dielectric constant of the surface layer of the photoconductor 13, S is the surface area of the photoconductor 13 contributing to charging, d is the film thickness of the surface layer of the photoconductor 13, L is the length of the photoconductor 13 contributing to charging, and λ is the linear velocity of the photoconductor 13. The linear velocity of the photoconductor 13 is represented by the circumferential length (expressed in mm) of the rotating photoconductor 13 per second. It is understood that the output current Tout of the high-voltage power source 11 depends on the linear velocity λ of the photoconductor 13, where ε·L·λ/d represents the charging impedance.

For example, assuming that the surface potential Vd0 of the photoconductor 13 before charging and the surface potential Vd of the photoconductor 13 after charging are negative voltages, the positive output current Tout (charge-removal current) flowing in response to switching from the first charging DC bias V1 to the second charging DC bias V0 is calculated as follows.

In one example, the first charging DC bias V1 is set to –700 V, and the second charging DC bias V0 is set to –150 V. The charge-removal current flowing to remove the charge from the photoconductor 13 charged to –700 V to reduce the surface potential to –150 V is calculated.

In Equation (4) above, at the time of initial use of the charging roller 12, the surface potential Vd0 of the photoconductor 13 before charging is equal to the first charging DC bias V1, and the surface potential Vd of the photoconductor 13 after charging is equal to the second charging DC bias V0. The time of initial use of the charging roller 12 refers to, for example, a time immediately after the power is first turned on to the image forming apparatus 1 after shipment to market or a time immediately after the power is first turned on to the image forming apparatus 1 after the replacement of the charging roller 12. The initial use of the charging roller 12 is an example of the initial use of the image forming apparatus 1.

In one example, the dielectric constant c of the surface layer of the photoconductor 13 is set to a value given by 4.0×10–11 F/m, the length L of the photoconductor 13 contributing to charging is set to 300 mm, the linear velocity λ of the photoconductor 13 is set to 200 mm/s, and the film thickness d of the surface layer of the photoconductor 13 is set to 30 μm. Since the surface potential Vd0 (=V1) of the photoconductor 13 before charging is –700 V and the surface potential Vd (=V0) of the photoconductor 13 after charging is –150 V, the charge-removal current (positive output current Tout) is calculated from Equation (4) above in the following way.

$$\begin{aligned} Iout &= \frac{\varepsilon\cdot L\cdot\lambda}{d}(Vd-Vd0) \\ &= \frac{4.0\times10^{-11}[\mathrm{F/m}]\cdot300[\mathrm{mm}]\cdot[\mathrm{mm/s}]}{30[\mu\mathrm{m}]}\cdot \\ &\quad \{-700[\mathrm{V}]-(-150[\mathrm{V}])\} \\ &= 44\,\mu\mathrm{A} \end{aligned} \qquad \text{Equation (5)}$$

When the linear velocity λ is 300 mm/s, the charge-removal current (positive output current Iout) is calculated from Equation (4) above in the following way.

$$\begin{aligned} Iout &= \frac{\varepsilon\cdot L\cdot\lambda}{d}(Vd-Vd0) \\ &= \frac{4.0\times10^{-11}[\mathrm{F/m}]\cdot300[\mathrm{mm}]\cdot[\mathrm{mm/s}]}{30[\mu\mathrm{m}]}\cdot \\ &\quad \{-700[\mathrm{V}]-(-150[\mathrm{V}])\} \\ &= 66\,\mu\mathrm{A} \end{aligned} \qquad \text{Equation (6)}$$

Accordingly, it is understood that the charge-removal current (positive output current Iout) changes in accordance with the linear velocity λ of the photoconductor 13.

Circuit Configuration of High-Voltage Power Source

Figure 6:
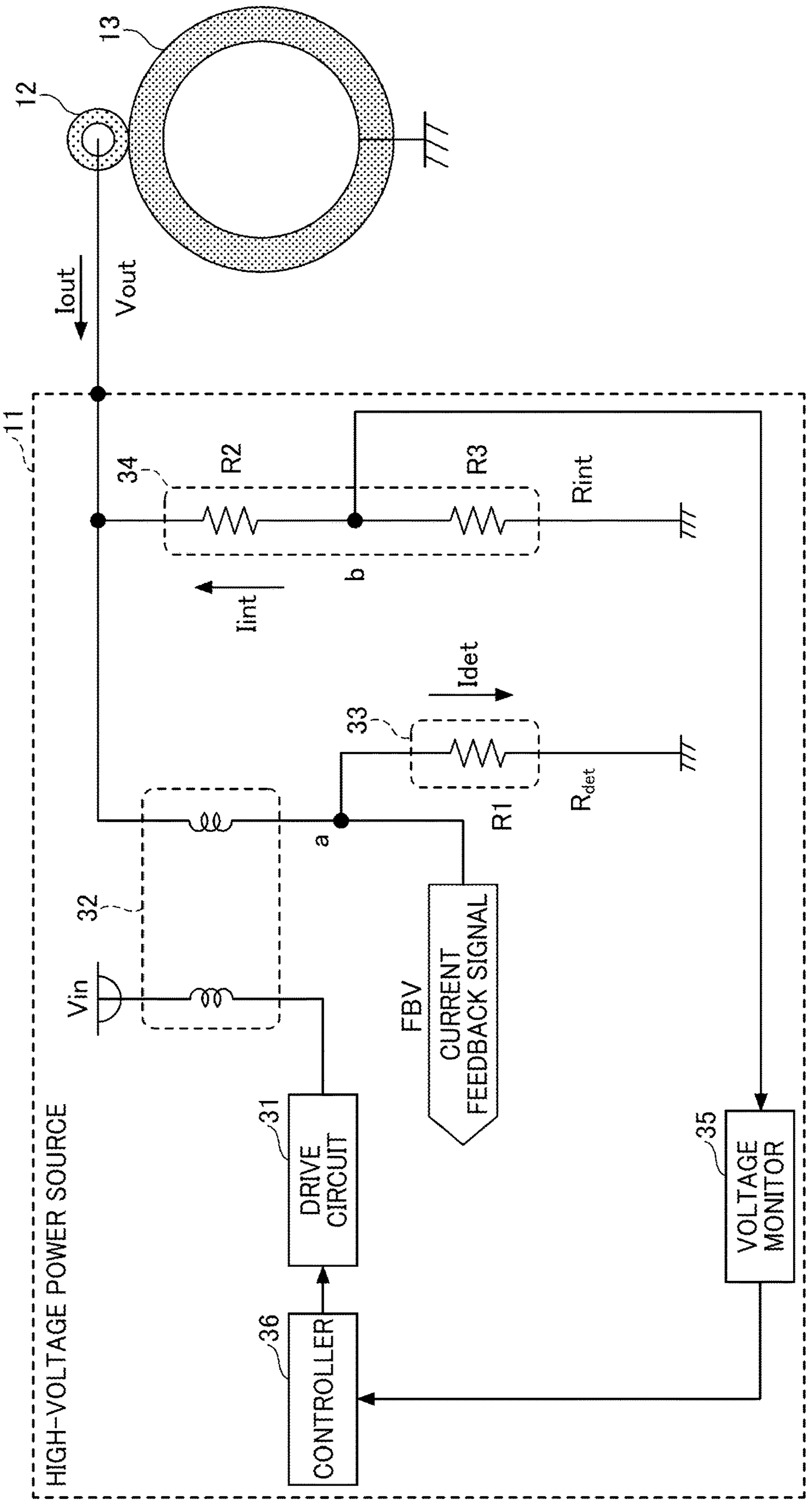
FIG. 6 is a diagram illustrating the circuit configuration of a high-voltage power source according to an embodiment of the present disclosure.

FIG. 6 is a diagram illustrating the circuit configuration of the high-voltage power source 11 according to the present embodiment. In the illustrated example, for simplicity of description, the high-voltage power source 11 is a DC high-voltage power source. That is, the high-voltage power source 11 includes the charging DC bias generation unit 21 and the charging DC current detection unit 23, but does not include the charging AC bias generation unit 22.

The high-voltage power source 11 includes a drive circuit 31, a transformer 32, a current detection circuit 33, a voltage detection circuit 34, a voltage monitor 35, and a controller 36. The functions of the voltage monitor 35 and the controller 36 may be implemented by the control board 20 described above.

The drive circuit 31 includes a switching element such as a transistor and controls the operation of the transformer 32. The transformer 32 operates under the control of the drive circuit 31 to generate a DC voltage higher than an input voltage Vin such as 24 V from the input voltage Vin.

The current detection circuit 33 corresponds to the charging DC current detection unit 23. The current detection circuit 33 includes a current detection resistor R1 having a detection resistance value Rdet. The current detection circuit 33 detects an output current Tout at a point a and outputs a current feedback signal FB to the higher-level control board 20.

The voltage detection circuit 34 includes bleeder resistors R2 and R3 having an internal resistance value Rint. The voltage detection circuit 34 divides an output voltage Vout at a point b and outputs a voltage detection signal to the voltage monitor 35. The voltage monitor 35 transmits a deviation of a detected voltage from a target voltage input from the higher-level control board 20 to the controller 36.

The controller 36 receives a control signal C1 such as a PWM signal from the higher-level control board 20 and adjusts the on-off interval of the switching element of the drive circuit 31 in accordance with the control signal C1.

The controller 36 further adjusts the first charging DC bias such that the deviation of the detected voltage from the target voltage approaches zero. The controller 36 may perform the adjustment by using a control method such as proportional (P) control, proportional-integral (PI) control, or proportional-integral-differential (PID) control.

Output Current Detection Method

The relationship between the current feedback signal voltage FBV and the output current Iout will now be described. As given by Equation (7) below, the current feedback signal voltage FBV is represented by the product of the detection resistance value Rdet of the current detection resistor R1 and a detection current Idet flowing through the current detection resistor R1.

$$FBV = Rdet \times Idet \qquad \text{Equation (7)}$$

During the application of the first charging DC bias, the output voltage Vout of the high-voltage power source 11 is negative. Thus, the output current Iout (charging current) of the high-voltage power source 11 flows to the negative polarity (to the left in FIG. 6). At this time, an internal current Ent flows within the high-voltage power source 11. As given by Equation (8) below, the internal current Iint is represented by the quotient of the output voltage Vout of the high-voltage power source 11 and the internal resistance value Rint of the bleeder resistors R2 and R3. The internal current Iint of the high-voltage power source 11 is also negative.

$$Iint = \frac{Vout}{Rint} \qquad \text{Equation (8)}$$

As illustrated in FIG. 6, the detection current Idet is represented by the sum of the internal current Ent of the high-voltage power source 11 and the output current Iout (charging current) of the high-voltage power source 11, as given by Equation (9) below.

$$Idet = -(Iout + Iint) \qquad \text{Equation (9)}$$

In summary, the current feedback signal voltage FBV can be derived from Equation (10) below.

$$FBV = -\left\{Rdet \times \left(Iout * \frac{Vout}{Rint}\right)\right\} \qquad \text{Equation (10)}$$

For example, the detection resistance value Rdet of the current detection resistor R1 is set to 5 kΩ, the output voltage Vout of the high-voltage power source 11 is set to −700 V, the negative output current Iout (charging current) of the high-voltage power source 11 is set to −30 μA, and the internal resistance value Rint of the bleeder resistors R2 and R3 is set to 2 MΩ. In this case, the current feedback signal voltage FBV can be calculated by Equation (11) below.

$$FBV = -\left\{Rdet \times \left(Iout + \frac{Vout}{Rint}\right)\right\} = -\left\{5k\Omega \times \left(-30\mu A + \frac{-700V}{2M\Omega}\right)\right\} = 1.9V \qquad \text{Equation (11)}$$

When the second charging DC bias is applied (when the charge-removal current is generated), in contrast, the output current Tout of the high-voltage power source 11 flows to the positive polarity (to the right in FIG. 6). For example, the detection resistance value Rdet of the current detection resistor R1 is set to 5 kΩ, the output voltage Vout of the high-voltage power source 11 is set to −700 V, the positive output current Iout (charge-removal current) of the high-voltage power source 11 is set to +30 μA, and the internal resistance value Rint of the bleeder resistors R2 and R3 is set to 2 MΩ. In this case, the current feedback signal voltage FBV can be calculated by Equation (12) below.

$$FBV = -\left\{Rdet \times \left(Iout + \frac{Vout}{Rint}\right)\right\} = -\left\{5k\Omega \times \left(+30\mu A + \frac{-700V}{2M\Omega}\right)\right\} = 1.6V \qquad \text{Equation (12)}$$

In other words, the arithmetic processor 25 of the control board 20 can detect the output current Iout (charging current or charge-removal current) from the current feedback signal voltage FBV in accordance with Equation (10).

Next, a method for detecting the surface potential Vd of the photoconductor 13 will be described.

In an image forming apparatus according to the related art, if a surface potential of an image bearer such as a photoconductor is to be detected for all speeds (e.g., rotational speed) of the image bearer, a detection current may change depending on the speed. Accordingly, it has been difficult to detect a surface potential with desired accuracy. A detection method according to an embodiment of the present disclosure can increase detection accuracy of a surface potential.

As given by Equation (4) above, the output current Tout is in proportion to the difference (Vd−Vd0) between the surface potential Vd of the photoconductor 13 after charging and the surface potential Vd0 of the photoconductor 13 before charging. At the time of initial use of the charging roller 12, the surface potential Vd of the photoconductor 13 after charging is substantially equal to the first charging DC bias V1 for image formation.

At the time of initial use of the charging roller 12, the second charging DC bias V0 for charge removal is set to −150 V, and several points are taken for the first charging DC bias V1 for image formation. As a result, a relationship illustrated in FIG. 7 is obtained.

Figure 7:
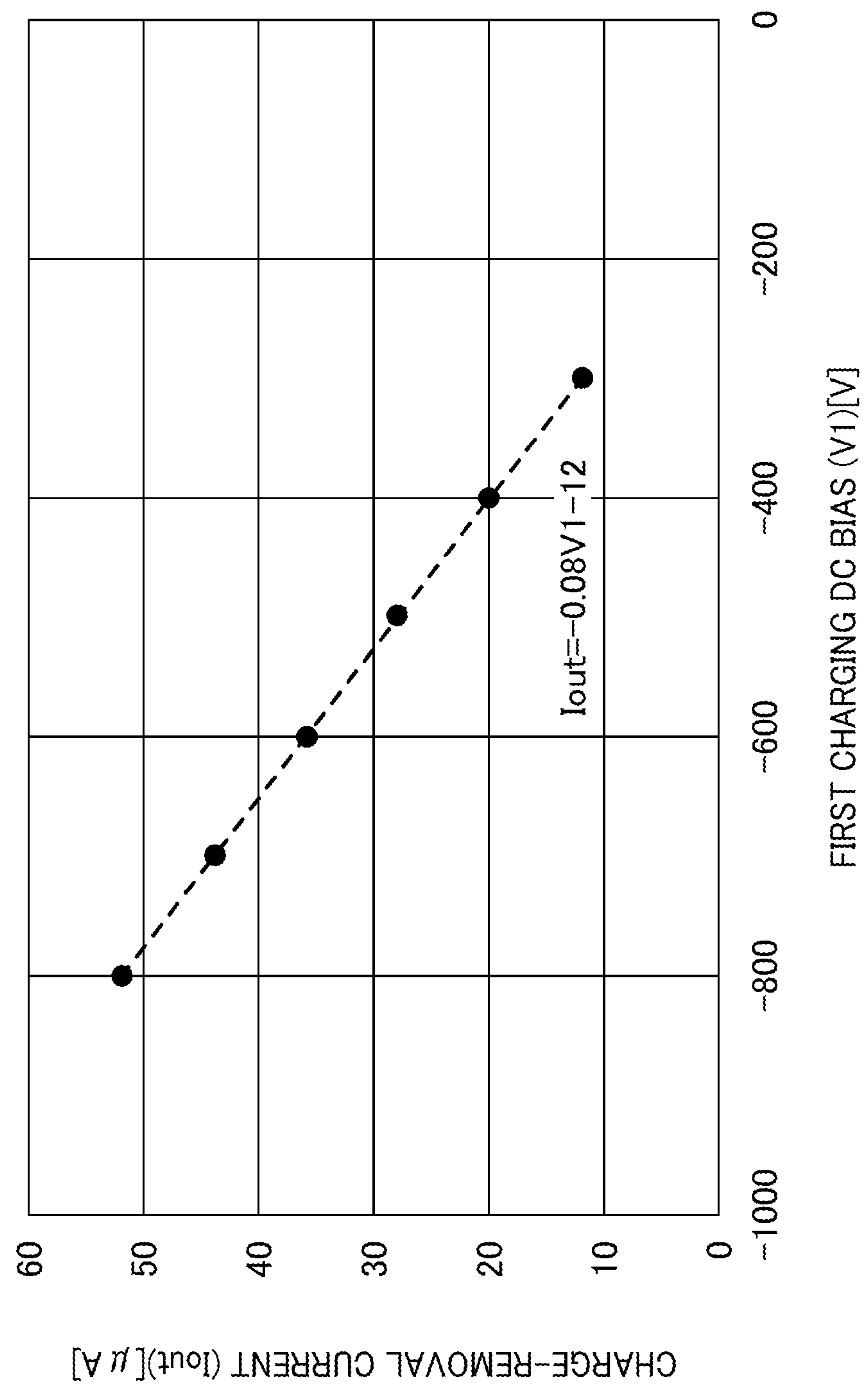
FIG. 7 is a graph illustrating an initial relationship between a first charging DC bias and a charge-removal current according to an embodiment of the present disclosure.

FIG. 7 is a graph illustrating an initial relationship between the first charging DC bias (V1) and the charge-removal current (Iout) according to the present embodiment. In one example, the dielectric constant c of the surface layer of the photoconductor 13 is set to a value given by 4.0×10−11 F/m, the length L of the photoconductor 13 contributing to charging is set to 300 mm, the linear velocity λ of the photoconductor 13 is set to 200 mm/s, and the film thickness d of the surface layer of the photoconductor 13 is set to 30 μm.

At the time of initial use of the charging roller 12, the arithmetic processor 25 plots the relationship between the first charging DC bias V1 and the charge-removal current (positive output current Iout), as illustrated in FIG. 7. After that, the arithmetic processor 25 calculates a V1-Iout characteristic relational expression (approximate expression of Equation (4) above) and stores the relational expression in the memory 24. In the example illustrated in FIG. 7, the V1-Iout characteristic relational expression is expressed by Equation (13) below.

$$Iout=-0.08\times V1-12 \quad \text{Equation (13)}$$

By contrast, as the charging roller 12 is used over time (and is worn out), the surface potential Vd of the photoconductor 13 after charging is not equal to the first charging DC bias V1 for image formation, but is decreased by an amount equal to an error potential ΔVd (Vd=V1−ΔVd, i.e., V1=Vd+ΔVd).

Accordingly, as the charging roller 12 is used over time (and is worn out), the arithmetic processor 25 detects a charge-removal current (positive output current Iout) from the current feedback signal voltage FBV and substitutes the charge-removal current into the V1-Iout characteristic relational expression obtained in FIG. 7. As a result, the actual surface potential Vd of the photoconductor 13 (i.e., the error potential ΔVd) can be detected.

In one example, as the charging roller 12 is used over time (and is worn out), the first charging DC bias V1 for charging the photoconductor 13 is set to −700 V, and the second charging DC bias V0 for removing the charge from the photoconductor 13 is set to −150 V. At this time, if the detected charge-removal current (positive output current Iout) is 40 μA, the actual surface potential Vd of the photoconductor 13 can be detected to be −650 V (i.e., the error potential Δd is −50 V) from the V1-Iout characteristic relational expression in Equation (13).

Figure 8:
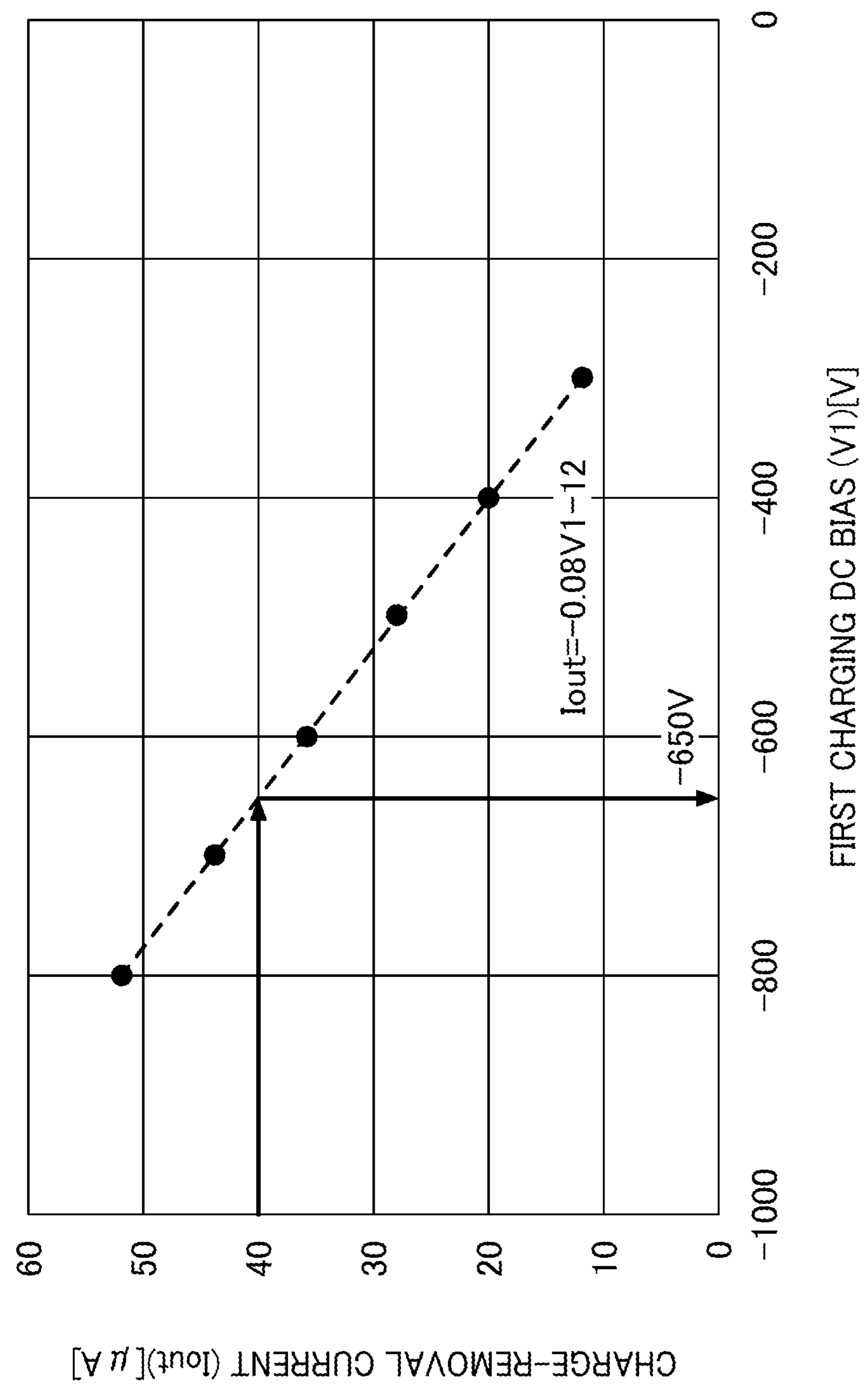
FIG. 8 is a graph illustrating a temporal relationship between a first charging DC bias and a charge-removal current according to an embodiment of the present disclosure.

FIG. 8 is a graph illustrating a temporal relationship between the first charging DC bias (V1) and the charge-removal current (Iout) according to the present embodiment. As illustrated in FIG. 8, the surface potential Vd of the photoconductor 13 is decreased by the error potential ΔVd (−50 V) relative to the first charging DC bias V1 (−700 V) for image formation (i.e., the surface potential Vd of the photoconductor 13 is −650 V).

Thus, setting the first charging DC bias V1 to be higher than the desired surface potential Vd (−700 V) of the photoconductor 13 by an amount equal to the error potential ΔVd (−50 V) (i.e., setting the surface potential Vd of the photoconductor 13 to −750 V) makes it possible to charge the photoconductor 13 to the desired potential. As a result, it is possible to reduce the occurrence of an unwanted image caused by scumming, carrier adhesion, or other reasons.

First Embodiment

A first embodiment for setting the first charging DC bias V1 in accordance with the linear velocity λ of the photoconductor 13 will be described hereinafter.

First, the relationship between the charge-removal current (positive output current Iout) and the current feedback signal voltage FBV will be described. The current feedback signal voltage FBV can be derived using Equation (10) above. In one example, the detection resistance value Rdet of the current detection resistor R1 is set to 50 kΩ, the output voltage Vout of the high-voltage power source 11 is set to −150 V, and the internal resistance value Rint of the bleeder resistors R2 and R3 is set to 2 MΩ. At this time, the relationship between the charge-removal current (positive output current Iout) and the current feedback signal voltage FBV in the example illustrated in FIG. 7 is illustrated in FIG. 9.

Figure 9:
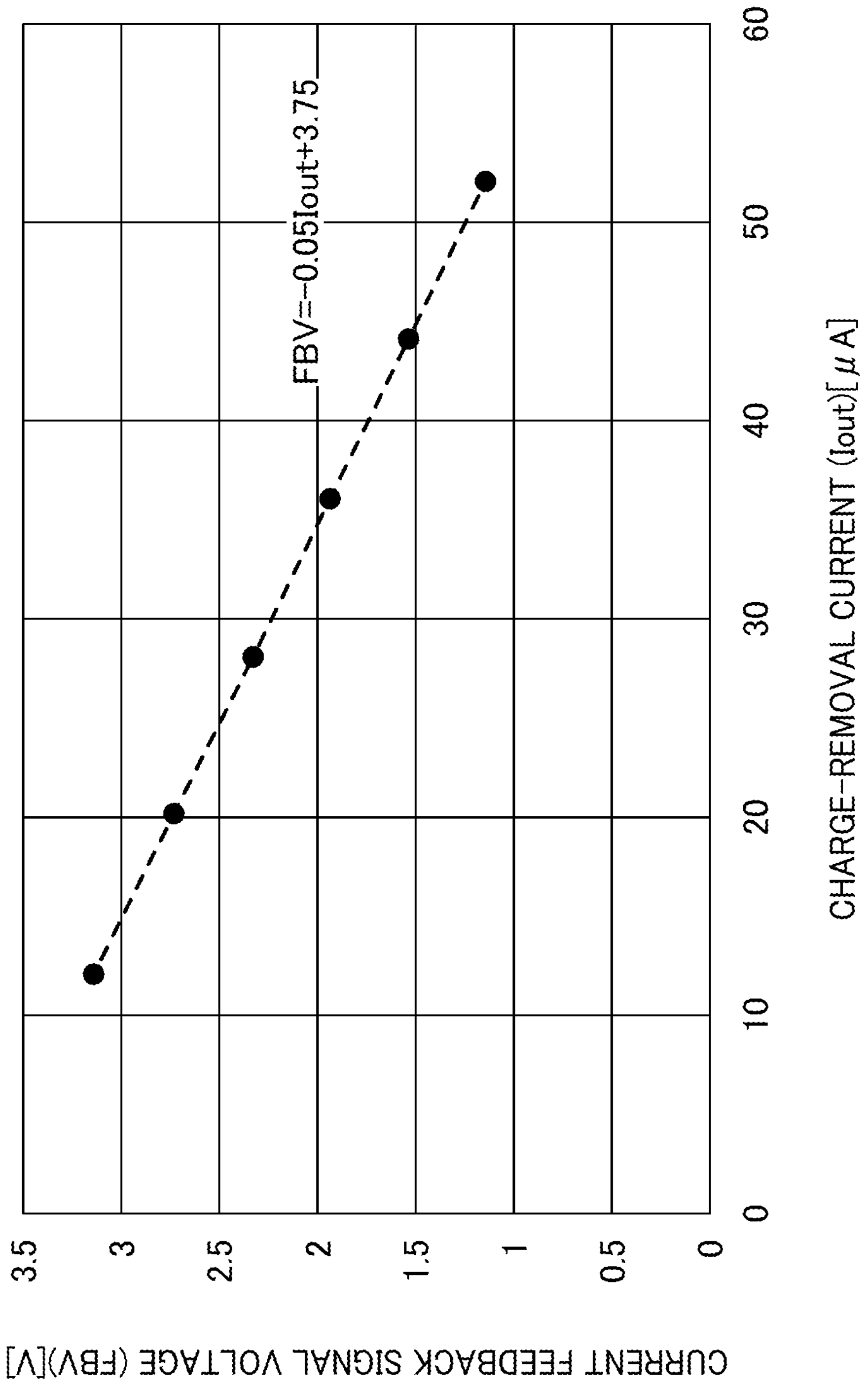
FIG. 9 is a graph illustrating an initial relationship between a charge-removal current and a current feedback signal voltage according to a first embodiment of the present disclosure.

FIG. 9 is a graph illustrating an initial relationship between the charge-removal current (Iout) and the current feedback signal voltage (FBV) according to the first embodiment. In actual use, the linear velocity λ has several types for machine specifications. As given by Equation (4) above, the charge-removal current flowing through the photoconductor 13 changes with the linear velocity λ of the photoconductor 13. The relationship between the charge-removal current (positive output current Iout) and the current feedback signal voltage FBV when the linear velocity λ of the photoconductor 13 is set to 100 mm/s, 200 mm/s, and 300 mm/s is illustrated in FIG. 10.

Figure 10:
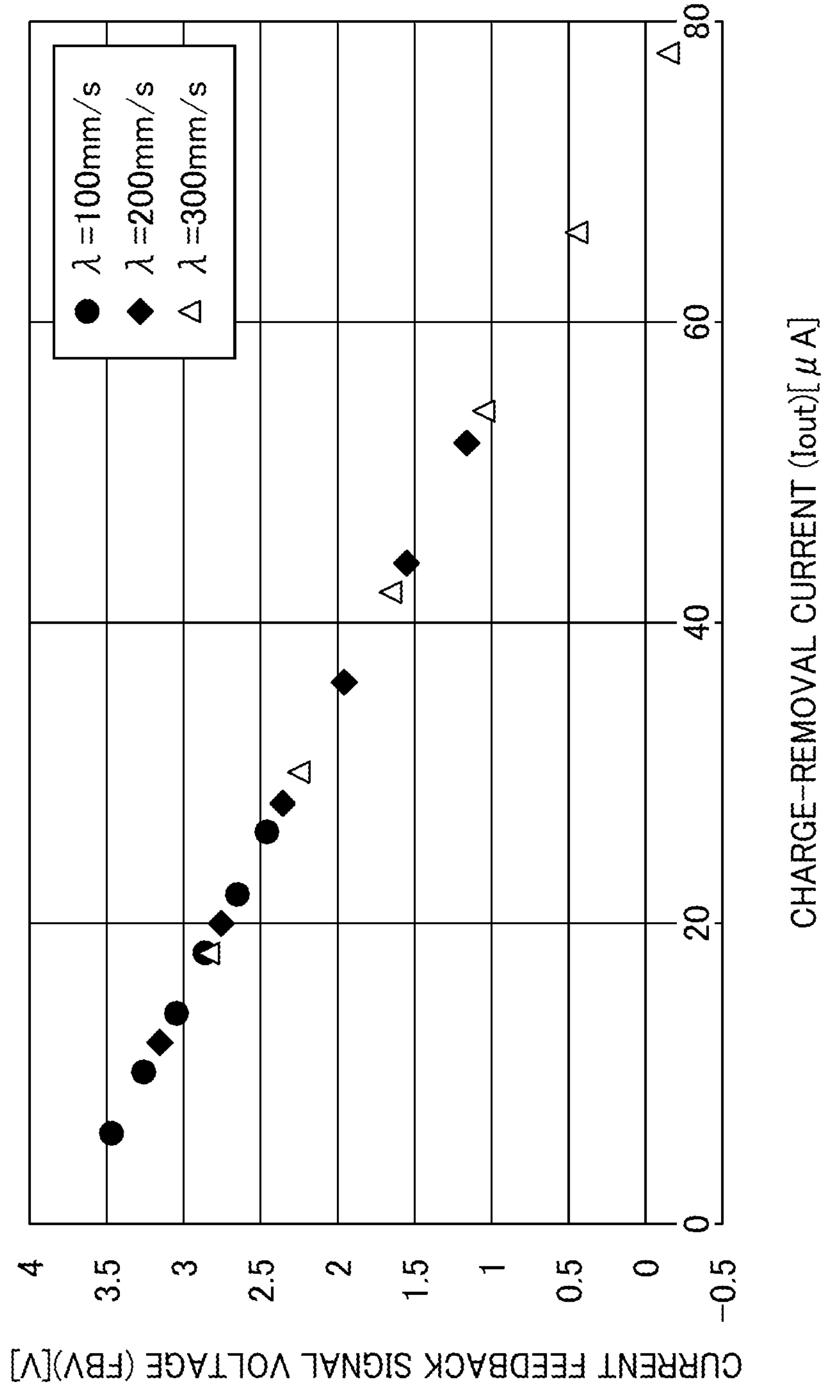
FIG. 10 is a graph illustrating a relationship between a charge-removal current and a current feedback signal voltage when the linear velocity changes according to the first embodiment of the present disclosure.

FIG. 10 is a graph illustrating a relationship between the charge-removal current (Iout) and the current feedback signal voltage (FBV) when the linear velocity λ changes according to the first embodiment. For example, the power supply voltage of the A/D converter 45 of the control board 20 is 3.3 V. If the current feedback signal voltage FBV becomes greater than or equal to 3.3 V, the A/D converter 45 fails to detect a voltage. If the current feedback signal voltage FBV exceeds the withstand voltage, the A/D converter 45 may be damaged. If the current feedback signal voltage FBV is less than or equal to 0 V, the A/D converter 45 also fails to detect a voltage, or the A/D converter 45 may be damaged.

The restrictions on the A/D converter 45 can be overcome by selecting the detection resistance value Rdet of the current detection resistor R1 so as to support all the values of the linear velocity λ of the photoconductor 13 (i.e., decreasing the detection resistance value Rdet). However, the voltage range of the current feedback signal voltage FBV used at each value of the linear velocity λ is narrowed, resulting in a decrease in voltage detection resolution.

Accordingly, the technology disclosed herein optimizes the first charging DC bias V1 for charging the photoconductor 13 in accordance with the linear velocity λ of the photoconductor 13 to overcome the restrictions on an electronic component such as the A/D converter 45 or the current detection resistor R1.

FIG. 11 is a table illustrating settings of the first charging DC bias V1 according to the linear velocity λ in the first embodiment. The absolute value of the first charging DC bias V1 decreases as the linear velocity λ increases, and increases as the linear velocity λ decreases. The arithmetic processor 25 sets the first charging DC bias V1 for image formation in accordance with the linear velocity λ As a result, the relationship between the charge-removal current (positive output current Iout) and the current feedback signal voltage FBV when the linear velocity changes is illustrated in FIG. 12.

Figure 12:
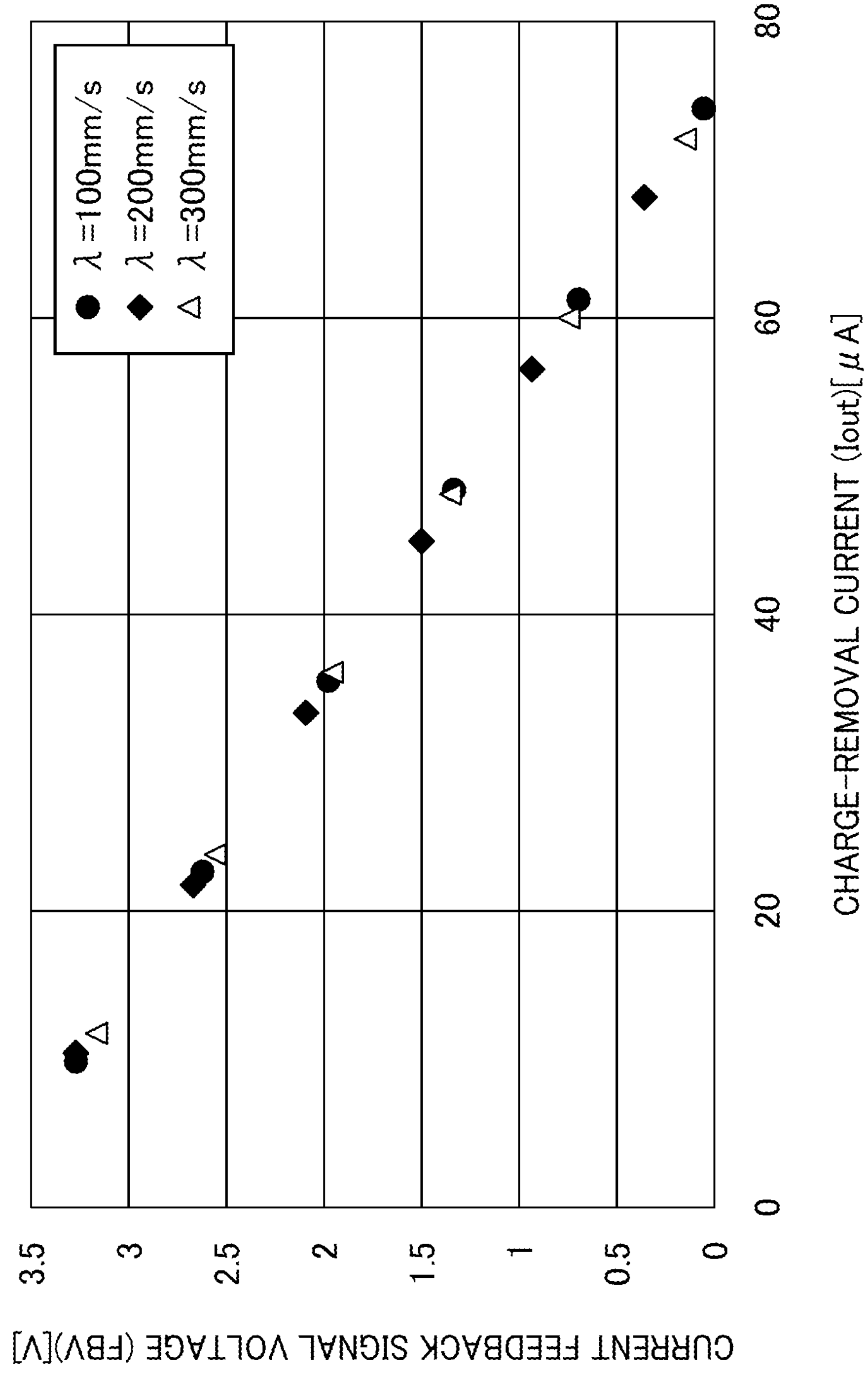
FIG. 12 is a graph illustrating a relationship between a charge-removal current and a current feedback signal voltage when the linear velocity changes according to the first embodiment of the present disclosure.

FIG. 12 is a graph illustrating a relationship between the charge-removal current (Iout) and the current feedback signal voltage (FBV) when the linear velocity λ changes according to the first embodiment. The first charging DC bias V1 and the parameters other than the linear velocity λ are the same as those used in the example illustrated in FIG. 7 or 9.

The application of the first charging DC bias V1 corresponding to the linear velocity λ can generate a current feedback signal voltage FBV of 0 V to 3.3 V without reducing the detection resistance value Rdet of the current detection resistor R1, regardless of the linear velocity λ That is, it is possible to detect the charge-removal current with high resolution, and therefore it is possible to increase the detection accuracy of the surface potential Vd of the photoconductor 13.

Figure 13:
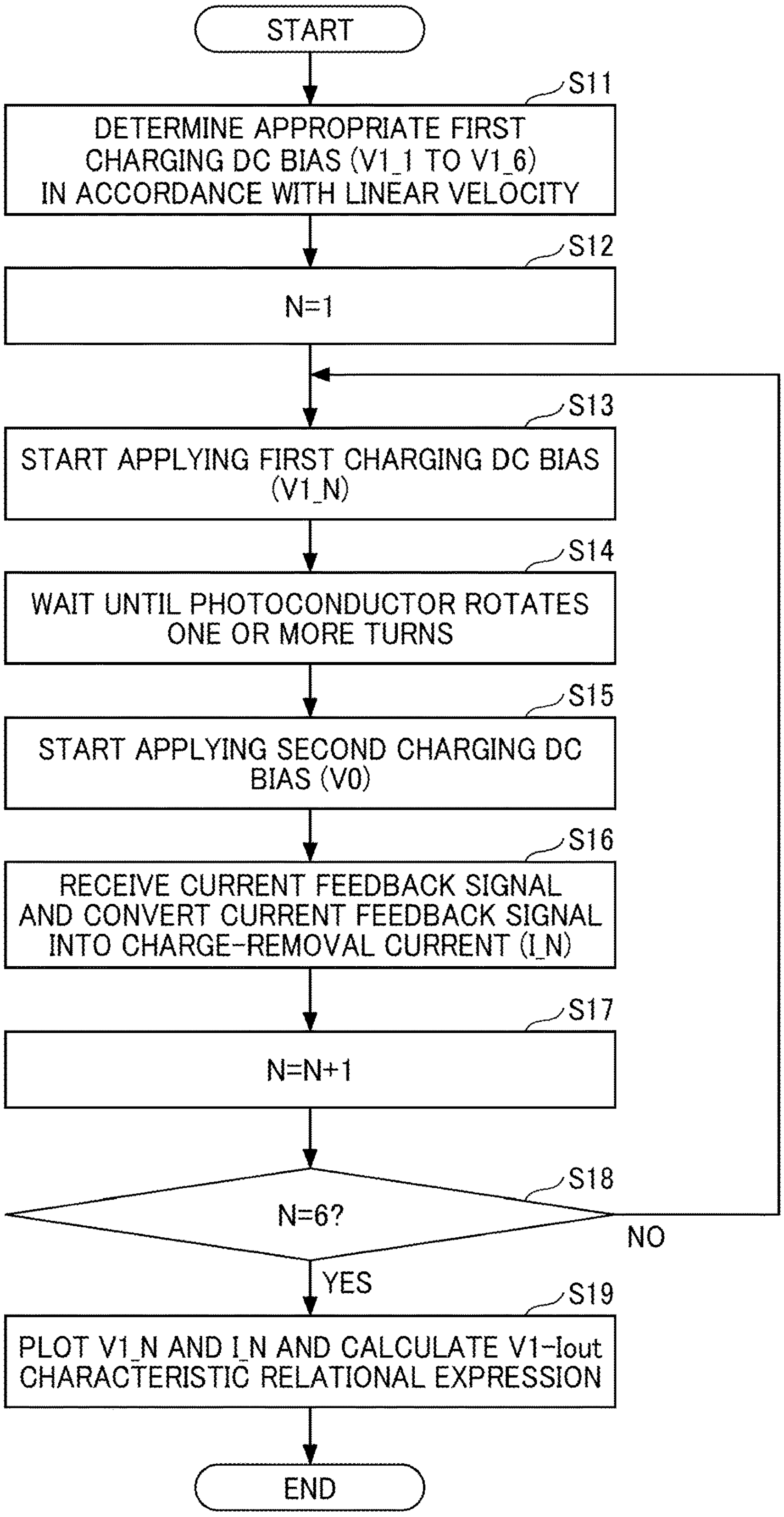
FIG. 13 is a flowchart for calculating a V1-Iout characteristic relational expression according to the first embodiment of the present disclosure.
Figure 14:
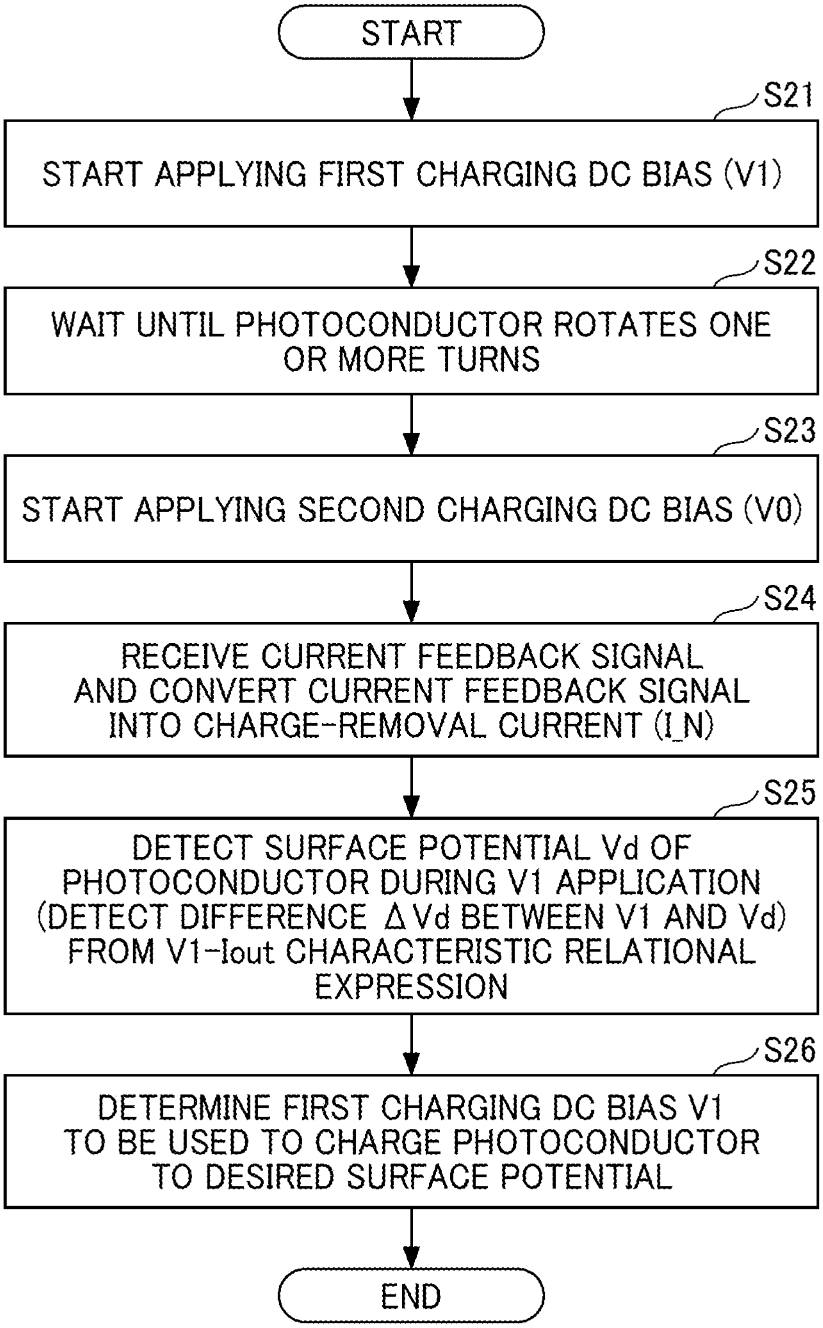
FIG. 14 is a flowchart for determining a first charging DC bias according to the first embodiment of the present disclosure.

A control method for controlling the image forming apparatus 1 according to the first embodiment will be described hereinafter. FIG. 13 is a flowchart for calculating a V1-Iout characteristic relational expression according to the first embodiment. FIG. 14 is a flowchart for determining a first charging DC bias according to the first embodiment.

The functions in the illustrated flowcharts are implemented by a processor such as the CPU 44 of the arithmetic processor 25 or a computer executing a program.

The flowchart in FIG. 13 illustrates a process performed at the time of initial use of the charging roller 12. The process includes applying a plurality of types of first charging DC biases V1 in accordance with the linear velocity λ of the photoconductor 13 to detect a plurality of types of output currents Iout, calculating a V1-Iout characteristic relational expression, and storing the V1-Iout characteristic relational expression in the memory 24.

The flowchart in FIG. 14 illustrates a process performed as the charging roller 12 is used over time (and is worn out). The process includes detecting the surface potential Vd of the photoconductor 13 (i.e., the error potential Δd) from a detected output current Iout and the V1-Iout characteristic relational expression, and determining a charging DC bias based on the error potential Δd.

First, the operation of the image forming apparatus 1 at the time of initial use of the charging roller 12 will be described with reference to FIG. 13.

In step S11, the arithmetic processor 25 of the control board 20 determines an appropriate first charging DC bias V1 in accordance with the linear velocity λ of the photoconductor 13. In the first embodiment, six types of first charging DC biases V1, namely, V1_1 to V1_6 illustrated in FIG. 11, are set in advance, by way of example but not limitation. Any number of two or more types of first charging DC biases V1 may be set in advance.

At this time, the arithmetic processor 25 leaves the first charging DC bias V1 unchanged if the first charging DC bias V1 has an appropriate value suitable for the linear velocity λ, and changes the first charging DC bias V1 if the first charging DC bias V1 does not have an appropriate value suitable for the linear velocity λ.

The processing of steps S12 to S18 is a loop process in which the arithmetic processor 25 calculates a charge-removal current (I_N, with N being an integer of 1 to 6) for each of the six types of first charging DC biases V1 (V1_N, with N being an integer of 1 to 6). In step S12, the arithmetic processor 25 substitutes 1 for the variable N.

In step S13, the arithmetic processor 25 transmits the control signal C1 to the charging DC bias generation unit 21, and the charging DC bias generation unit 21 starts applying the first charging DC bias V1 (V1_N).

In step S14, to uniformly charge the surface of the photoconductor 13, the arithmetic processor 25 waits until the photoconductor 13 rotates one or more turns, and the charging DC bias generation unit 21 continuously applies the first charging DC bias V1. In the first embodiment, the arithmetic processor 25 waits for a period of time during which the photoconductor 13 rotates one or more turns. In another embodiment, the arithmetic processor may wait for a period of time during which the photoconductor 13 rotates one turn or less.

In step S15, the arithmetic processor 25 transmits the control signal C1 to the charging DC bias generation unit 21 to switch from the first charging DC bias V1 (V_N) to the second charging DC bias V0. In response to the control signal C1, the charging DC bias generation unit 21 starts applying the second charging DC bias V0 (−150 V). Switching from the first charging DC bias V1 to the second charging DC bias V0 removes the charge from the photoconductor 13. The second charging DC bias V0 may be applied for a period of time during which the photoconductor 13 rotates one turn, or for a longer or shorter period of time.

In step S16, the arithmetic processor 25 receives the current feedback signal FB detected by the charging DC current detection unit 23 during the application of the second charging DC bias V0, and converts the current feedback signal voltage FBV into a charge-removal current (positive output current Iout) in accordance with Equation (10) above.

The arithmetic processor 25 may receive the current feedback signal FB by using any other method and perform conversion into a charge-removal current by using any other method. In one example, the arithmetic processor 25 may perform sampling a plurality of times during the generation of a charge-removal current and perform conversion into a charge-removal current. In another example, the arithmetic processor 25 may perform conversion into a charge-removal current from one point at a specific timing.

In step S17, the arithmetic processor 25 increments the variable N (N=N+1). In step S18, the arithmetic processor 25 determines whether a condition for terminating the loop process is satisfied (N=6?).

In step S19, the arithmetic processor 25 plots the relationship between the first charging DC bias V1 (V1_N) and the charge-removal current (I_N) in the manner as illustrated in FIG. 7, and stores the V1-Iout characteristic relational expression in the memory 24.

Next, the operation of the image forming apparatus 1 as the charging roller 12 is used over time will be described with reference to FIG. 14.

In step S21, the arithmetic processor 25 transmits the control signal C1 to the charging DC bias generation unit 21, and the charging DC bias generation unit 21 starts applying the first charging DC bias V1.

In step S22, to uniformly charge the surface of the photoconductor 13, the arithmetic processor 25 waits until the photoconductor 13 rotates one or more turns, and the charging DC bias generation unit 21 continuously applies the first charging DC bias V1. In the first embodiment, the arithmetic processor 25 waits for a period of time during which the photoconductor 13 rotates one or more turns. In another embodiment, the arithmetic processor 25 may wait for a period of time during which the photoconductor 13 rotates one turn or less.

The first charging DC bias V1 may be a charging DC bias corrected by the image forming apparatus 1 through another adjustment operation, or a charging DC bias corrected from temperature, humidity, deterioration over time, or the like. Alternatively, the first charging DC bias V1 may be a specific fixed value.

In step S23, the arithmetic processor 25 transmits the control signal C1 to the charging DC bias generation unit 21 to switch from the first charging DC bias V1 to the second charging DC bias V0. In response to the control signal C1, the charging DC bias generation unit 21 starts applying the second charging DC bias V0 (−150 V). Switching from the first charging DC bias V1 to the second charging DC bias V0 removes the charge from the photoconductor 13. The second charging DC bias V0 may be applied for a period of time during which the photoconductor 13 rotates one turn, or for a longer or shorter period of time.

In step S24, the arithmetic processor 25 receives the current feedback signal FB detected by the charging DC current detection unit 23, and converts the current feedback signal voltage FBV into a charge-removal current (positive output current Iout) in accordance with Equation (10) above.

The arithmetic processor 25 may receive the current feedback signal FB by using any other method and perform conversion into a charge-removal current by using any other method. In one example, the arithmetic processor 25 may perform sampling a plurality of times during the generation of a charge-removal current and perform conversion into a charge-removal current. In another example, the arithmetic processor 25 may perform conversion into a charge-removal current from one point at a specific timing.

In step S25, the arithmetic processor 25 detects the surface potential Vd of the photoconductor 13 from the V1-Iout characteristic relational expression stored in the memory 24 in step S19 by using the first charging DC bias V1 applied after the flowchart illustrated in FIG. 14 is started. That is, the arithmetic processor 25 detects the error potential ΔVd (i.e., the difference between the first charging DC bias V1 and the surface potential Vd of the photoconductor 13).

In step S26, the arithmetic processor 25 determines the first charging DC bias V1 to be used to charge the photoconductor 13 to a desired surface potential Vd, based on the error potential ΔVd. That is, the arithmetic processor 25 corrects the first charging DC bias V1 for image formation so as to increase the first charging DC bias V1 by an amount equal to the error potential ΔVd. The arithmetic processor 25 uses the determined first charging DC bias V1 in the next and subsequent printing operations.

In the first embodiment, the first charging DC bias V1 is changed in accordance with the linear velocity λ of the photoconductor 13. Thus, it is possible to improve the current detection accuracy, regardless of restrictions on an electronic component such as the A/D converter 45 or the current detection resistor R1, and therefore it is possible to increase the detection accuracy of the surface potential Vd of the photoconductor 13.

At the time of initial use of the image forming apparatus 1 (e.g., at the time of initial use of the charging roller 12), a plurality of types of first charging DC biases V1 (V1_1 to V1_6) are applied in accordance with the linear velocity λ, and a plurality of types of output currents Iout (I_N) are detected and plotted. As a result, a V1-Iout characteristic relational expression is obtained and stored in the memory 24.

After that, as the image forming apparatus 1 is used over time (e.g., as the charging roller 12 is used over time), the first charging DC bias is switched to the second charging DC bias, and a positive output current Iout (charge-removal current) is detected during the application of the second charging DC bias. Alternatively, the second charging DC bias is switched to the first charging DC bias, and a negative output current Tout (charging current) is detected during the application of the first charging DC bias. Then, the surface potential Vd of the photoconductor 13 (i.e., the error potential ΔVd) is detected.

In the subsequent printing operation, the first charging DC bias V1 is set to be higher by an amount equal to the error potential ΔVd so that the photoconductor 13 can be charged to a desired surface potential Vd. As a result, it is possible to reduce the occurrence of an unwanted image caused by scumming, carrier adhesion, or other reasons.

Second Embodiment

An example of setting the first charging DC bias V1 in accordance with the film thickness d of the surface layer of the photoconductor 13 will be described hereinafter.

Equation (4) above indicates that the output current Iout (charge-removal current or charging current) also depends on the film thickness d of the surface layer of the photoconductor 13. The film thickness d varies depending on the photoconductor 13 and may cause a detection error of the output current Tout.

Figure 15:
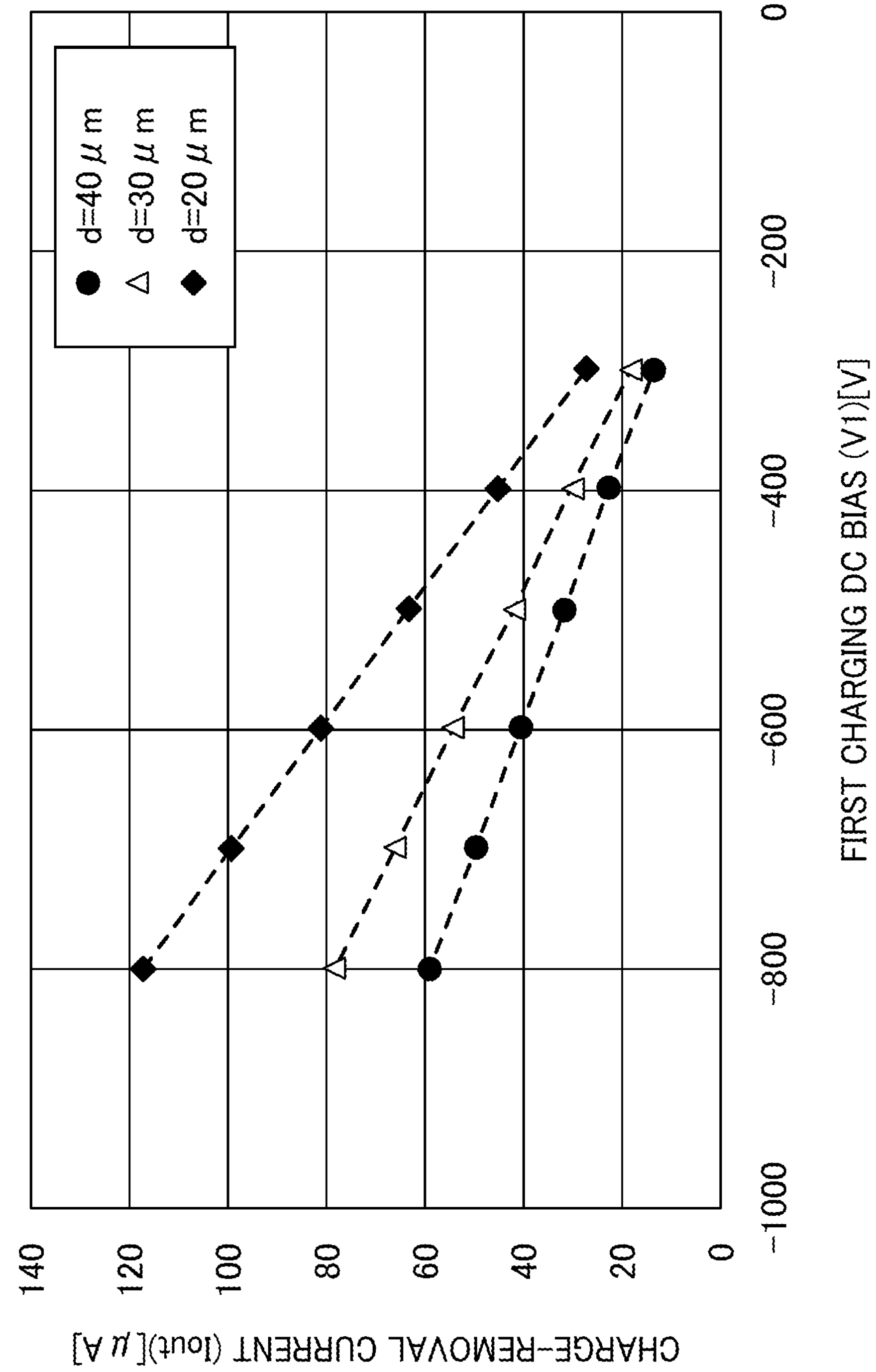
FIG. 15 is a graph illustrating a relationship between a first charging DC bias and a charge-removal current when the film thickness of a surface layer of a photoconductor changes according to a second embodiment of the present disclosure.

The relationship between the first charging DC bias V1 and the charge-removal current (positive output current Iout) when the film thickness d of the surface layer of the photoconductor 13 is set to 20 μm, 30 μm, and 40 μm is illustrated in FIG. 15. FIG. 15 is a graph illustrating a relationship between the first charging DC bias (V1) and the charge-removal current (Iout) when the film thickness d changes according to a second embodiment. As indicated in FIG. 15, the charge-removal current (Iout) increases as the film thickness d decreases.

Figure 16:
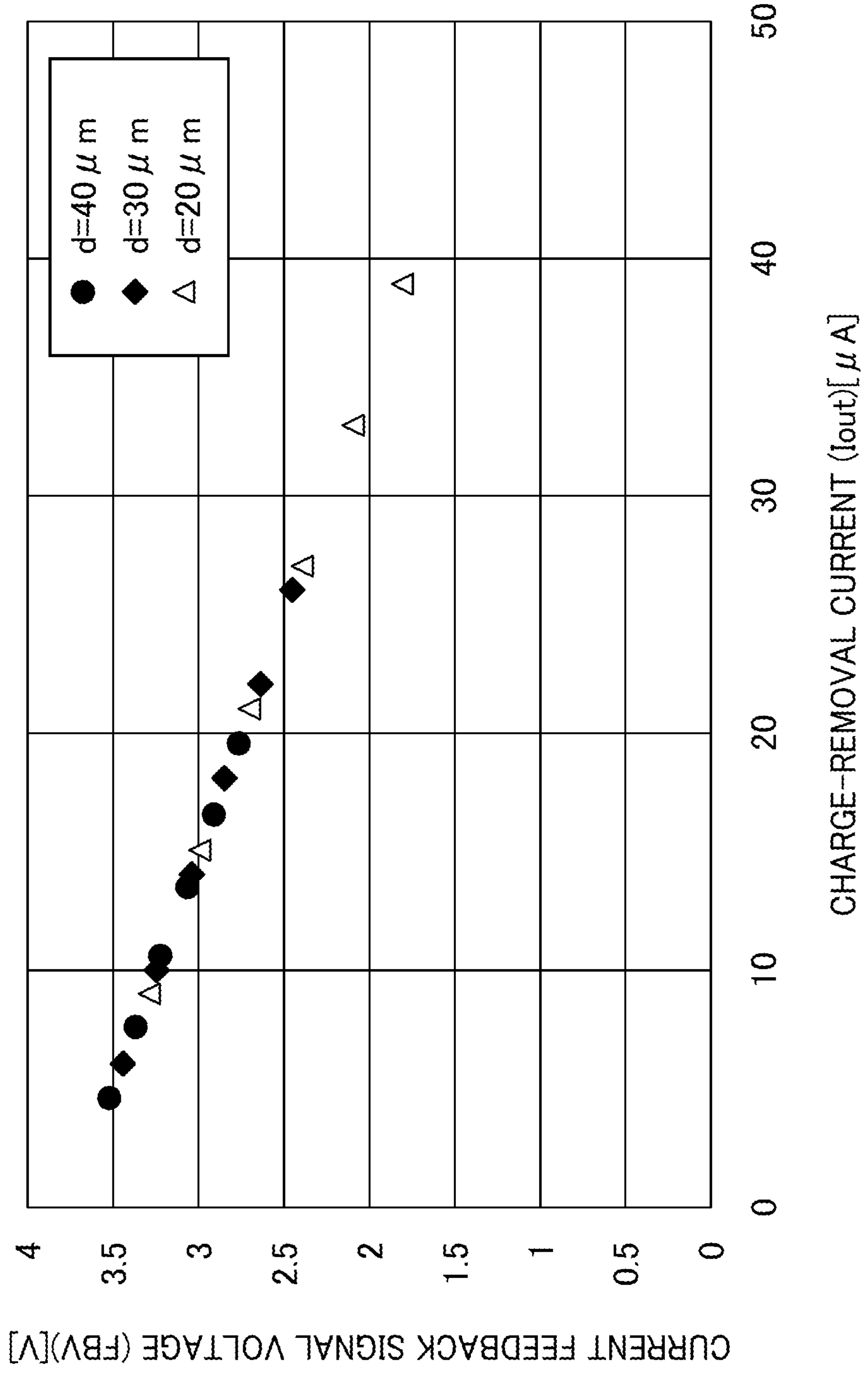
FIG. 16 is a graph illustrating a relationship between a charge-removal current and a current feedback signal voltage when the film thickness changes according to the second embodiment of the present disclosure.
Figure 17:
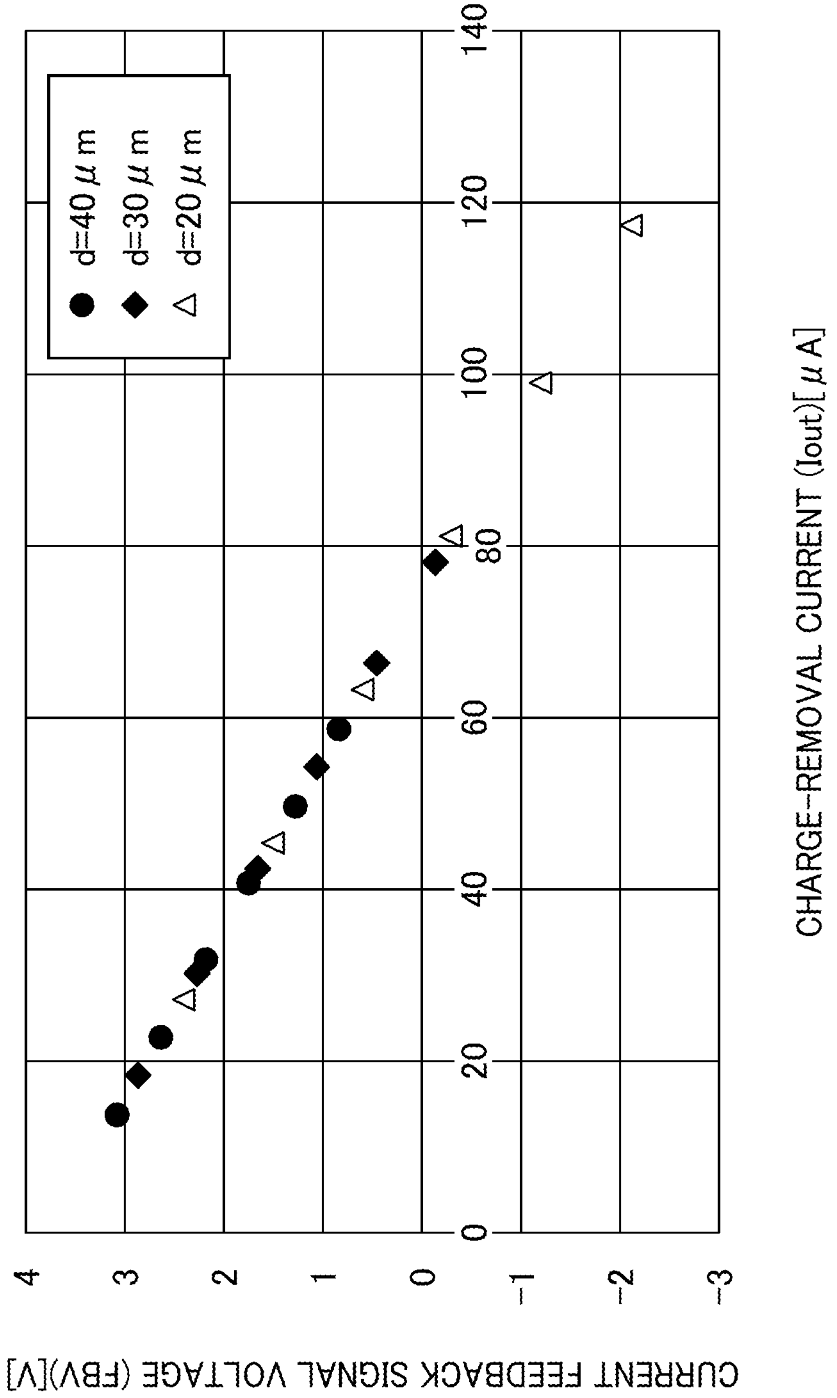
FIG. 17 is a graph illustrating a relationship between a charge-removal current and a current feedback signal voltage when the film thickness changes according to the second embodiment of the present disclosure.

FIGS. 16 and 17 are graphs illustrating relationships between the charge-removal current (Iout) and the current feedback signal voltage (FBV) when the film thickness d changes according to the second embodiment. The parameters other than the film thickness d are the same as those used in the example illustrated in FIG. 7 or 9.

As illustrated in FIG. 16, when the linear velocity λ of the photoconductor 13 is 100 mm/s, the current feedback signal voltage FBV is in a range of 1.8 V to 3.525 V. Since the voltage range exceeds the power supply voltage of the A/D converter 45, namely, 3.3 V, and a voltage range less than or equal to 1.8 V is not used, the current detection resolution is low.

By contrast, as illustrated in FIG. 17, when the linear velocity λ of the photoconductor 13 is 300 mm/s, the current feedback signal voltage FBV is in a range of −2.1 V to 3.075 V. The application of a voltage of 0 V or less may damage the A/D converter 45.

The restrictions on the A/D converter 45 can be overcome by selecting the detection resistance value Rdet of the current detection resistor R1 so as to support all of the error factors including variations in the film thickness d of the surface layer of the photoconductor 13 and the linear velocity λ of the photoconductor 13. However, the current detection resolution may be lower than in the first embodiment.

Accordingly, the technology disclosed herein optimizes the first charging DC bias V1 for charging the photoconductor 13 in accordance with the film thickness d of the surface layer of the photoconductor 13 to overcome the restrictions on an electronic component such as the A/D converter 45 or the current detection resistor R1.

Figure 18:
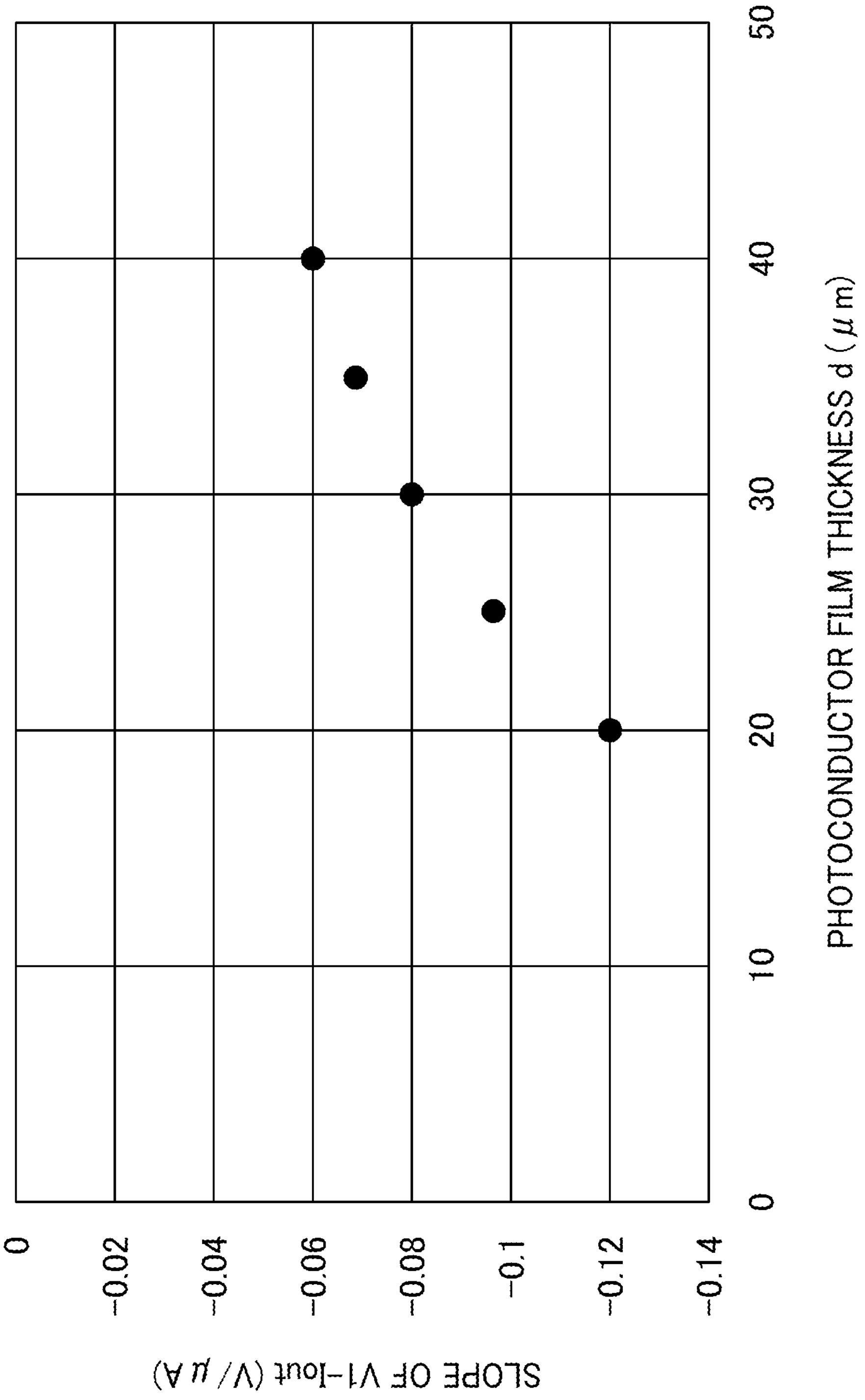
FIG. 18 is a graph illustrating a relationship between the film thickness and the slope of a V1-Iout characteristic according to the second embodiment of the present disclosure.

As will be understood from Equation (4) above and FIG. 15, the slope of the V1-Iout characteristic (the slope of the relational expression between the first charging DC bias V1 and the output current Iout) changes with the film thickness d of the surface layer of the photoconductor 13, and the slope of the V1-Iout characteristic is proportional to the film thickness d of the surface layer of the photoconductor 13. FIG. 18 is a graph illustrating a relationship between the film thickness d and the slope of the V1-Iout characteristic according to the second embodiment. FIG. 18 illustrates the slope of the V1-Iout characteristic when the film thickness d of the surface layer of the photoconductor 13 ranges from 20 μm to 40 μm.

Accordingly, at the time of initial use of the charging roller 12, the film thickness d of the surface layer of the photoconductor 13 is detected from the slope of the derived V1-Iout characteristic, and the first charging DC bias V1 is optimized in accordance with the detected film thickness d. As the charging roller 12 is used over time (and is worn out), the surface potential Vd of the photoconductor 13 is detected, thereby making it possible to detect a current in an optimum range. As a result, it is possible to increase the detection accuracy of the surface potential Vd of the photoconductor 13.

Figure 20:
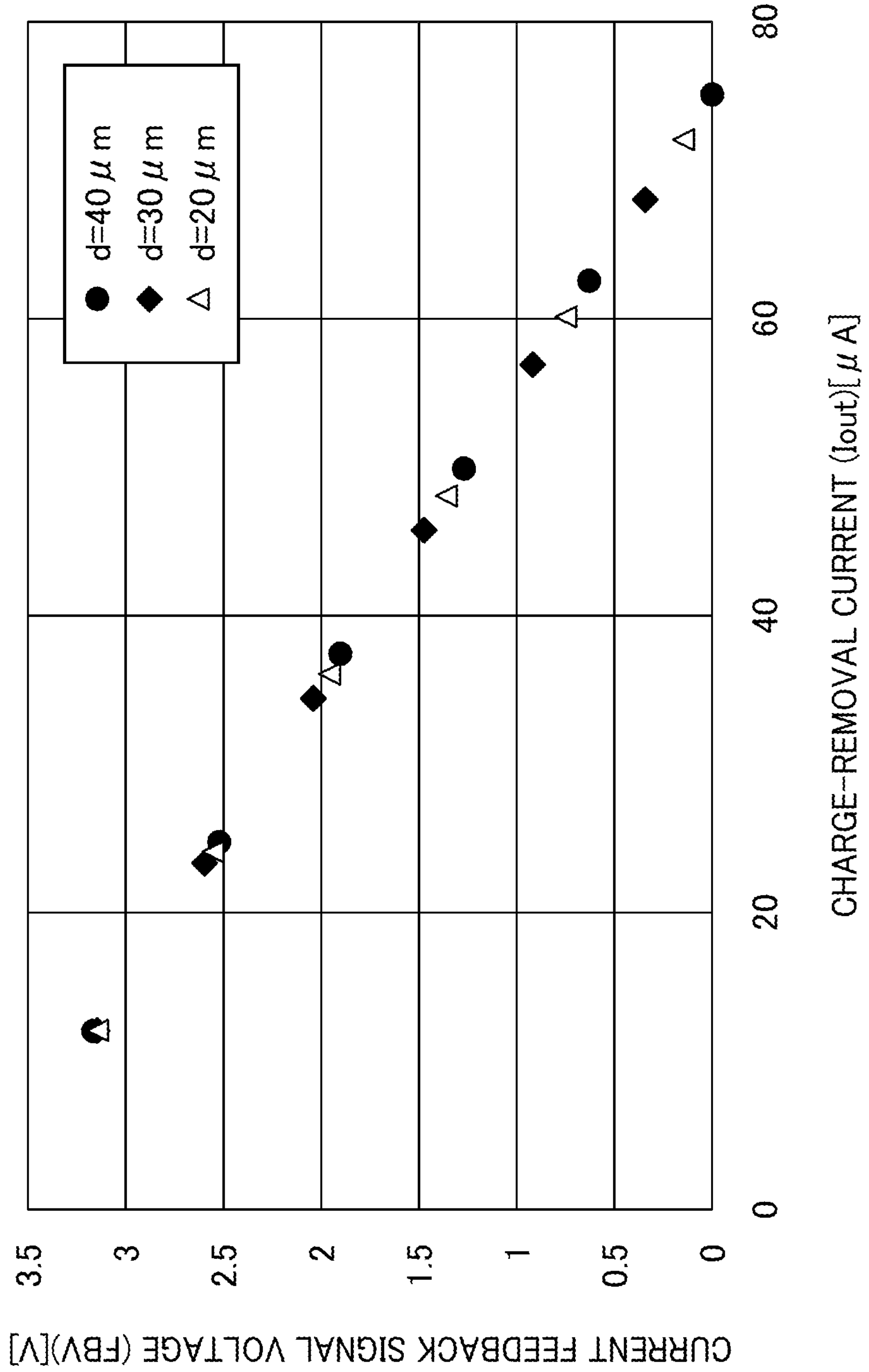
FIG. 20 is a graph illustrating a relationship between a charge-removal current and a current feedback signal voltage when the film thickness changes according to the second embodiment of the present disclosure.

FIG. 19 is a table illustrating settings of the first charging DC bias V1 according to the film thickness d in the second embodiment. For example, the first charging DC bias V1 is set in accordance with the film thickness d of the surface layer of the photoconductor 13 in the manner as illustrated in FIG. 19, thereby obtaining a relationship illustrated in FIG. 20 between the charge-removal current (Iout) and the current feedback signal voltage (FBV). FIG. 20 is a graph illustrating a relationship between the charge-removal current (Iout) and the current feedback signal voltage (FBV) when the film thickness d changes according to the second embodiment.

That is, a current feedback signal voltage FBV of 0 V to 3.3 V can be generated without reduction of the detection resistance value Rdet of the current detection resistor R1, regardless of the film thickness d. Thus, a charge-removal current can be detected with high resolution. The first charging DC bias V1 and the parameters other than the film thickness d are the same as those used in the example illustrated in FIG. 7 or 9.

The first charging DC bias V1 may be set in accordance with a combination of both the linear velocity λ of the photoconductor 13 according to the first embodiment and the film thickness d of the surface layer of the photoconductor 13 according to the second embodiment.

In the second embodiment, the arithmetic processor 25 detects the film thickness d of the surface layer of the photoconductor 13 from the relationship between the first charging DC bias V1 (V1_N) and the charge-removal current (I_N) (i.e., the slope of the V1-Iout characteristic) plotted in step S19 in FIG. 13 described in the first embodiment.

In step S11 in FIG. 13, the arithmetic processor 25 determines, based on the detected value of the film thickness d of the surface layer of the photoconductor 13, an appropriate first charging DC bias V1 in accordance with the film thickness d. Also in the second embodiment, six types of first charging DC biases V1, namely, V1_1 to V1_6 illustrated in FIG. 19, are set in advance, by way of example but not limitation. Any number of two or more types of first charging DC biases V1 may be set in advance.

At this time, the arithmetic processor 25 leaves the first charging DC bias V1 unchanged if the first charging DC bias V1 has an appropriate value suitable for the film thickness d, and changes the first charging DC bias V1 if the first charging DC bias V1 does not have an appropriate value suitable for the film thickness d.

The arithmetic processor 25 stores the detected film thickness d in the memory 24. When the flowchart illustrated in FIG. 14 is executed, the arithmetic processor 25 detects the surface potential Vd of the photoconductor 13 (i.e., the error potential ΔVd) in accordance with the detected film thickness d or in accordance with both of the detected output current Tout and the detected film thickness d. Other operations are similar to those in the flowcharts illustrated in FIGS. 13 and 14 described in the first embodiment, and the description thereof will thus be omitted.

In the second embodiment, the film thickness d of the surface layer of the photoconductor 13 is detected from the slope of the V1-Iout characteristic, and the first charging DC bias V1 is changed in accordance with the detected thickness d. Thus, it is possible to improve the current detection accuracy, regardless of restrictions on an electronic component such as the A/D converter 45 or the current detection resistor R1, and therefore it is possible to increase the detection accuracy of the surface potential Vd of the photoconductor 13.

At the time of initial use of the image forming apparatus 1 (e.g., at the time of initial use of the charging roller 12), a plurality of types of first charging DC biases V1 (V1_1 to V1_6) are applied in accordance with the film thickness d, and a plurality of types of output currents Tout (I_N) are detected and plotted. As a result, a V1-Iout characteristic relational expression is obtained and stored in the memory 24.

After that, as the image forming apparatus 1 is used over time (e.g., as the charging roller 12 is used over time), the first charging DC bias is switched to the second charging DC bias, and a positive output current Tout (charge-removal current) is detected during the application of the second charging DC bias. Alternatively, the second charging DC bias is switched to the first charging DC bias, and a negative output current Iout (charging current) is detected during the application of the first charging DC bias. Then, the surface potential Vd of the photoconductor 13 (i.e., the error potential ΔVd) is detected.

In the subsequent printing operation, the first charging DC bias V1 is set to be higher by an amount equal to the error potential ΔVd so that the photoconductor 13 can be charged to a desired surface potential Vd. As a result, it is possible to reduce the occurrence of an unwanted image caused by scumming, carrier adhesion, or other reasons.

The various functions in the embodiments described above may be implemented by one or more processing circuits or circuitry. The term "processing circuit or circuitry", as used herein, is used to include a processor programmed to implement each function using software, such as a processor for implementation using an electronic circuit or circuitry. Alternatively, the term "processing circuit or circuitry" is used to include a device designed to implement each function, such as an application specific integrated circuit (ASIC) or a digital signal processor (DSP). Additionally or alternatively, the term "processing circuit or circuitry" is used to include a device such as a field programmable gate array (FPGA) or an existing circuit module. Any one of the above-described operations may be performed in various other ways, for example, in an order different from the one described above.

The following non-limiting examples illustrate aspects of the present disclosure.

According to Aspect 1, an image forming apparatus includes an image bearer, a power source, a voltage applying device, and a controller. The power source generates a voltage. The voltage applying device is disposed so as to face the image bearer. The voltage is applied to the voltage applying device. The controller controls the voltage of the power source. The controller switches the voltage between a first direct current (DC) bias and a second DC bias different from the first DC bias. The controller changes the first DC bias in accordance with a speed of the image bearer, based on a DC component of a current flowing between the power source and the image bearer during application of the second DC bias.

According to Aspect 2, in the image forming apparatus of Aspect 1, an absolute value of the first DC bias decreases as the speed increases, and the absolute value of the first DC bias increases as the speed decreases.

According to Aspect 3, in the image forming apparatus of Aspect 1 or Aspect 2, an absolute value of the first DC bias is larger than an absolute value of the second DC bias.

According to Aspect 4, in the image forming apparatus of any one of Aspect 1 to Aspect 3, the controller detects a film thickness of a surface layer of the image bearer in accordance with the current that is detected.

According to Aspect 5, in the image forming apparatus of any one of Aspect 1 to Aspect 4, the controller changes the first DC bias in accordance with a film thickness of a surface layer of the image bearer.

According to Aspect 6, in the image forming apparatus of any one of Aspect 1 to Aspect 5, the controller leaves the first DC bias unchanged in response to the first DC bias having an appropriate value suitable for the speed of the image bearer or a film thickness of a surface layer of the image bearer, and changes the first DC bias in response to the first DC bias not having an appropriate value suitable for the speed of the image bearer or the film thickness of the surface layer of the image bearer.

According to Aspect 7, in the image forming apparatus of any one of Aspect 1 to Aspect 6, the controller detects a surface potential of the image bearer in accordance with either the current that is detected or a detected film thickness of a surface layer of the image bearer or in accordance with both the current that is detected and the detected film thickness.

According to Aspect 8, in the image forming apparatus of Aspect 7, the controller corrects a DC bias for image formation, based on the detected surface potential of the image bearer.

According to Aspect 9, in the image forming apparatus of any one of Aspect 1 to Aspect 8, the power source applies an oscillating voltage to the voltage applying device. The oscillating voltage is a superimposition of a DC bias and an AC bias.

In Aspect 10, a control method for controlling an image forming apparatus includes switching, by the image forming apparatus, a voltage to be applied to a voltage applying device between a first direct current (DC) bias and a second DC bias different from the first DC bias, the voltage applying device being disposed so as to face an image bearer; detecting, by the image forming apparatus, a DC component of a current flowing between a power source that generates the voltage and the image bearer during application of the second DC bias; and changing, by the image forming apparatus, the first DC bias in accordance with a speed of the image bearer.

In Aspect 11, a program causes a computer that controls an image forming apparatus to execute switching a voltage to be applied to a voltage applying device between a first direct current (DC) bias and a second DC bias different from the first DC bias, the voltage applying device being disposed so as to face an image bearer; detecting a DC component of a current flowing between a power source that generates the voltage and the image bearer during application of the second DC bias; and changing the first DC bias in accordance with a speed of the image bearer.

The invention claimed is:

1. An image forming apparatus comprising:

an image bearer;

a power source that generates a voltage;

a voltage applying device facing the image bearer, the voltage applying device being applied with the voltage; and circuitry configured to control the voltage of the power source, the circuitry being configured to:

switch the voltage between a first direct current (DC) bias and a second DC bias different from the first DC bias; and change the first DC bias in accordance with a speed of the image bearer, based on a DC component of a current flowing between the power source and the image bearer during application of the second DC bias.

2. The image forming apparatus according to claim 1, wherein the first DC bias is set such that an absolute value of the first DC bias decreases as the speed increases and the absolute value of the first DC bias increases as the speed decreases.

3. The image forming apparatus according to claim 1, wherein an absolute value of the first DC bias is larger than an absolute value of the second DC bias.

4. The image forming apparatus according to claim 1, wherein the circuitry is configured to detect a film thickness of a surface layer of the image bearer in accordance with the current.

5. The image forming apparatus according to claim 1, wherein the circuitry is configured to change the first DC bias in accordance with a film thickness of a surface layer of the image bearer.

6. The image forming apparatus according to claim 1, wherein the circuitry is configured to:

leave the first DC bias unchanged in response to the first DC bias having an appropriate value suitable for the speed of the image bearer; and change the first DC bias in response to the first DC bias not having an appropriate value suitable for the speed of the image bearer.

7. The image forming apparatus according to claim 1, wherein the circuitry is configured to:

leave the first DC bias unchanged in response to the first DC bias having an appropriate value suitable for a film thickness of a surface layer of the image bearer; and change the first DC bias in response to the first DC bias not having an appropriate value suitable for the film thickness of the surface layer of the image bearer.

8. The image forming apparatus according to claim 1, wherein the circuitry is configured to detect a surface potential of the image bearer in accordance with at least one of the current or a film thickness of a surface layer of the image bearer.

9. The image forming apparatus according to claim 8, wherein the circuitry is configured to correct a DC bias for image formation, based on the detected surface potential of the image bearer.

10. The image forming apparatus according to claim 1, wherein the power source applies an oscillating voltage to the voltage applying device, the oscillating voltage being a superimposition of a DC bias and an AC bias.

11. A control method for controlling an image forming apparatus, the control method comprising:

switching a voltage to be applied to a voltage applying device between a first direct current (DC) bias and a second DC bias different from the first DC bias, the voltage applying device facing an image bearer;

detecting a DC component of a current flowing between a power source that generates the voltage and the image bearer during application of the second DC bias; and changing the first DC bias in accordance with a speed of the image bearer.

12. A non-transitory recording medium storing a plurality of instructions which, when executed by one or more processors, causes the processors to perform a control method for controlling an image forming apparatus, the control method comprising:

switching a voltage to be applied to a voltage applying device between a first direct current (DC) bias and a second DC bias different from the first DC bias, the voltage applying device facing an image bearer;

detecting a DC component of a current flowing between a power source that generates the voltage and the image bearer during application of the second DC bias; and changing the first DC bias in accordance with a speed of the image bearer.

* * * * *